(12) United States Patent
Chien et al.

(10) Patent No.: US 10,264,280 B2
(45) Date of Patent: *Apr. 16, 2019

(54) ENHANCED INTRA-PREDICTION MODE SIGNALING FOR VIDEO CODING USING NEIGHBORING MODE

(71) Applicant: QUALCOMM Incorporated, San Diego, CA (US)

(72) Inventors: Wei-Jung Chien, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,303

(22) Filed: Apr. 6, 2017

(65) Prior Publication Data

US 2017/0214940 A1    Jul. 27, 2017

Related U.S. Application Data

(63) Continuation of application No. 13/491,076, filed on Jun. 7, 2012, now Pat. No. 9,654,785.

(Continued)

(51) Int. Cl.
*H04N 19/593* (2014.01)
*H04N 19/176* (2014.01)
(Continued)

(52) U.S. Cl.
CPC .......... *H04N 19/593* (2014.11); *H04N 19/11* (2014.11); *H04N 19/176* (2014.11);
(Continued)

(58) Field of Classification Search
None
See application file for complete search history.

(56) References Cited

U.S. PATENT DOCUMENTS 6,980,596 B2  12/2005  Wang et al.
7,170,937 B2   1/2007  Zhou
(Continued)

FOREIGN PATENT DOCUMENTS

CA    2740467 A1    4/2010
CN   101087424 A   12/2007
(Continued)

OTHER PUBLICATIONS

Anonymous: "Test Model under Consideration for High-Efficiency Video Coding", 92. MPEG Meeting; Apr. 19, 2010-Apr. 23, 2010; Dresden; (Motion Picture Expert Group or ISO/IEC JTC1/SC29/WG11), No. N11280, Jul. 28, 2010 (Jul. 28, 2010), XP030017777, ISSN: 0000-0029, pp. 152.

(Continued)

*Primary Examiner* — Mohammad J Rahman
(74) *Attorney, Agent, or Firm* — Shumaker & Sieffert, P.A.

(57) ABSTRACT

This disclosure describes techniques for intra-prediction mode signaling for video coding. In one example, a video coder is configured to determine, for a block of video data, a set of most probable intra-prediction modes such that the set of most probable intra-prediction modes has a size that is equal to a predetermined number that is greater than or equal to two. The video coder is also configured to code a value representative of an actual intra-prediction mode for the block based at least in part on the set of most probable intra-prediction modes and code the block using the actual intra-prediction mode. The video coder may further be configured to code the block using the actual intra-prediction (Continued)

mode, e.g., to encode or decode the block. Video encoders and video decoders may implement these techniques.

24 Claims, 8 Drawing Sheets

Related U.S. Application Data

(60) Provisional application No. 61/533,118, filed on Sep. 9, 2011, provisional application No. 61/504,664, filed on Jul. 5, 2011, provisional application No. 61/503,712, filed on Jul. 1, 2011, provisional application No. 61/495,332, filed on Jun. 9, 2011.

(51) Int. Cl.
*H04N 19/186* (2014.01)
*H04N 19/11* (2014.01)
*H04N 19/46* (2014.01)
*H04N 19/196* (2014.01)
*H04N 19/463* (2014.01)

(52) U.S. Cl.
CPC ......... *H04N 19/186* (2014.11); *H04N 19/196* (2014.11); *H04N 19/46* (2014.11); *H04N 19/463* (2014.11)

(56) References Cited

U.S. PATENT DOCUMENTS

| | | | |
|---|---|---|---|
| 7,289,674 B2 | 10/2007 | Karczewicz | |
| 7,369,707 B2 | 5/2008 | Sakaguchi et al. | |
| 7,706,442 B2 | 4/2010 | Kuo | |
| 7,751,478 B2 | 7/2010 | Kim et al. | |
| 7,840,078 B2 | 11/2010 | Segall | |
| 7,933,334 B2 | 4/2011 | Kanehara | |
| 8,509,302 B2 | 7/2013 | Hayase et al. | |
| 8,711,935 B2 | 4/2014 | Kim et al. | |
| 8,976,870 B1* | 3/2015 | Cismas | H04N 19/593 375/240.24 |
| 9,100,649 B2 | 7/2015 | Park et al. | |
| 9,426,461 B2 | 8/2016 | Fu et al. | |
| 9,654,785 B2* | 5/2017 | Chien | H04N 19/176 |
| 9,661,324 B2 | 5/2017 | Lim et al. | |
| 9,706,204 B2* | 7/2017 | Song | H04N 19/159 |
| 9,756,338 B2 | 9/2017 | Sasai et al. | |
| 2003/0053711 A1 | 3/2003 | Kim | |
| 2004/0233989 A1 | 11/2004 | Kobayashi et al. | |
| 2005/0157797 A1 | 7/2005 | Gaedke | |
| 2006/0039470 A1 | 2/2006 | Kim et al. | |
| 2006/0133511 A1 | 6/2006 | Chen et al. | |
| 2006/0153292 A1 | 7/2006 | Liang et al. | |
| 2006/0153299 A1 | 7/2006 | Iwata et al. | |
| 2006/0182174 A1 | 8/2006 | Kuo | |
| 2007/0019726 A1 | 1/2007 | Cha et al. | |
| 2007/0036215 A1 | 2/2007 | Pan et al. | |
| 2008/0013629 A1 | 1/2008 | Karczewicz | |
| 2008/0175320 A1* | 7/2008 | Sun | H04N 19/197 375/240.12 |
| 2009/0052534 A1 | 2/2009 | Wang et al. | |
| 2009/0097556 A1 | 4/2009 | Nakagami et al. | |
| 2009/0110070 A1 | 4/2009 | Takahashi et al. | |
| 2009/0116549 A1 | 5/2009 | Shen et al. | |
| 2009/0196350 A1 | 8/2009 | Xiong | |
| 2009/0273491 A1* | 11/2009 | Sakaguchi | H03M 7/4006 341/51 |
| 2009/0296813 A1 | 12/2009 | Garg et al. | |
| 2010/0054331 A1 | 3/2010 | Haddad et al. | |
| 2010/0254457 A1 | 10/2010 | Xi | |
| 2010/0309977 A1 | 12/2010 | Andersson et al. | |
| 2011/0075735 A1 | 3/2011 | Drezner | |
| 2011/0085593 A1 | 4/2011 | Wang et al. | |
| 2011/0103483 A1 | 5/2011 | Kim | |
| 2011/0103485 A1* | 5/2011 | Sato | H04N 19/105 375/240.16 |
| 2011/0110425 A1 | 5/2011 | Zhang | |
| 2011/0255591 A1* | 10/2011 | Kim | H04N 19/107 375/240.02 |
| 2011/0292994 A1 | 12/2011 | Lim et al. | |
| 2012/0014440 A1* | 1/2012 | Segall | H04N 7/345 375/240.12 |
| 2012/0106636 A1 | 5/2012 | Kim et al. | |
| 2012/0121013 A1 | 5/2012 | Lainema et al. | |
| 2012/0177112 A1* | 7/2012 | Guo | H04N 19/13 375/240.12 |
| 2012/0300839 A1 | 11/2012 | Sze et al. | |
| 2012/0314766 A1* | 12/2012 | Chien | H04N 19/176 375/240.12 |
| 2013/0039421 A1* | 2/2013 | Lee | H04N 19/593 375/240.13 |
| 2013/0058411 A1* | 3/2013 | Xu | H04N 19/105 375/240.12 |
| 2013/0266232 A1 | 10/2013 | Sato | |
| 2013/0272401 A1 | 10/2013 | Seregin et al. | |
| 2014/0119439 A1 | 5/2014 | Guo et al. | |

FOREIGN PATENT DOCUMENTS

| | | |
|---|---|---|
| CN | 101877792 A | 11/2010 |
| EP | 2424246 A1 | 2/2012 |
| EP | 2536151 A2 | 12/2012 |
| EP | 2645715 A2 | 10/2013 |
| EP | 2658262 A2 | 10/2013 |
| EP | 2665269 A1 | 11/2013 |
| EP | 2696582 A2 | 2/2014 |
| EP | 2712192 A2 | 3/2014 |
| EP | 2882190 A1 | 6/2015 |
| JP | 2013058939 A | 3/2013 |
| KR | 20030073120 A | 9/2003 |
| KR | 20090012985 A | 2/2009 |
| KR | 20110003414 A | 1/2011 |
| RU | 2329615 C2 | 7/2008 |
| WO | 02071735 A2 | 9/2002 |
| WO | 03101117 A1 | 12/2003 |
| WO | 03105070 A1 | 12/2003 |
| WO | 2005055606 A1 | 6/2005 |
| WO | 2008145560 A1 | 12/2008 |
| WO | 2010032941 A2 | 3/2010 |
| WO | 2010036772 A2 | 4/2010 |
| WO | 2010090749 A1 | 8/2010 |
| WO | 2011021844 A2 | 2/2011 |
| WO | 2011031332 A1 | 3/2011 |
| WO | 2011099792 A2 | 8/2011 |
| WO | 2011126348 A2 | 10/2011 |
| WO | 2011152635 A2 | 12/2011 |
| WO | 2012042860 A1 | 4/2012 |
| WO | 2012070857 A2 | 5/2012 |
| WO | 2012087077 A2 | 6/2012 |
| WO | 2012092761 A1 | 7/2012 |
| WO | 2012092763 A1 | 7/2012 |
| WO | 2012094908 A1 | 7/2012 |
| WO | 2012096229 A1 | 7/2012 |
| WO | 2012119569 A1 | 9/2012 |
| WO | 2012126045 A1 | 9/2012 |
| WO | 2012134246 A2 | 10/2012 |
| WO | 2012164902 A1 | 12/2012 |

OTHER PUBLICATIONS

Bjontegaard G., et al., "Definition of New Coding Elements from Telenor", 10. VCEG Meeting, May 16, 2000-May 19, 2000, Osaka, JP, (Video Codingexperts Group of ITU-T 56.16), No. Q15-J-28, May 9, 2000 (May 9, 2000), pp. 1-25, XP030003057, ISSN: 0000-0466.

Bross, B., et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pages.

(56) References Cited

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012, 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F803, http://phenix.itsudparis.eu/jct/doc_end_user/documents/6_Torino/wg11/JCTVC-F803-v8_zip, Nov. 20, 2011, 229 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen, "BoG report on intra mode coding with fixed Number of MPM candidates" Joint Collaborative Team on Video Coding (JCT-VC) of ITU-T SG16 WP3 and ISO/IEC JTC1/SC29/WG11 6th Meeting: Torino, Jul. 22 through 14, 2011, JCTVC-F765, BoG_WD_fixedMPM_TrackA_doc, http://phenix.itsudparis.eu/jct/doc_end_user/documents/6_Torino/wvg11/JCTVC-F765-v5.zip, Aug. 4, 2011, 3 pp.

Chen J. et al., "CE6.A.4: Chroma intra prediction by reconstructed luma samples", Mar. 10, 2011, No. JCTVC-E266, Mar. 10, 2011, XP030008772, ISSN: 0000-0007.

Francois E. et al., "CE6b: Intra mode coding with 4 MPMs and mode ranking", 98. MPEG Meeting; Nov. 28, 2011-Dec. 2, 2011; Geneva; (Motion Picture Expert Group or ISO/IEC JTC1/SC29/WG11) No. m21801, Nov. 21, 2011, XP030050364.

International Preliminary Report on Patentability—PCT/US2012/041545, The International Bureau of WIPO—Geneva, Switzerland, Sep. 2, 2013.

International Search Report and Written Opinion—PCT/US2012/041545—ISA/EPO—Jul. 24, 2012.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Jinho L, et al., "Intra-Mixture Prediction Mode and Enhanced Most Probable Mode Estimation for Intra Coding", ETRI Journal. 31, 5, pp. 610-612, Oct. 2009. ISSN: 12256463.

Kanumuri S., et al., "Enhancements to Intra Coding", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11and ITU-T SG.16); URL: http://wftp3.itu.int/av-arch/jctvc-site/, No. JCTVC-D235, Jan. 14, 2011, pp. 1-7, XP030008275, ISSN: 0000-0013.

Li G. et al., Integration of plane mode in unified intra prediction, 3. JCT-VC Meeting; 94. MPEG Meeting; Oct. 7, 2010-Oct. 15, 2010; Guangzhou; (Joint Collaborative Team on Video Coding of ISO/IECJTC1/SC29/WG11 and ITU-T SG.16); URL: http://wftp3.itu.int/av-arch/jctvc-site/ No. JCTVC-C111, Oct. 2, 2010, XP030007818, ISSN: 0000-0045.

Lin, "A fast ranking-based method for intra mode decision in H.264/AVC encoder", International Symposium on VLSI Design Automation and Test (VLSI-DAT), Apr. 26, 2010, pp. 152-155, IEEE, XP031698598, ISBN: 978-1-4244-5269-9.

Second Written Opinion from International Application No. PCT/US2012/041545, dated Jun. 4, 2013, 11 pp.

Seregin, V. et al., "Intra mode parsing without access neighbouring information," Joint Collaborative Team on Video Coding (JCT-VC) of ITU-T SG16 WP3 and ISO/IEC JTC1/SC29/WG11 JCTVC-F378, http://phenix.it-sudparis.eu/jct/doc_end_user/documents/6_Torino/wg11/JCTVC-F378-v6.zip, 16 Pgs, Jul. 18, 2011.

Wiegand, et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5th Meeting: Geneva, CH, Mar. 16-23, 2011, JCTVC-E603, http://phenix.itsudparis.eu/jctldoc_end_user/documents/5_Geneva/wg11/JCTVC-E603-v8.zip, Jun. 27, 2011, 68 pp.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu/int/av-arch/jctvc-site/2011_01_D_Daegu/ [retrieved on Jul. 11, 2012], 153 pp.

Weigand, T., et al., "WD3: Working Draft 3 of High-Efficiency Video Coding," Document JCTVC-E603, 5th Meeting: Geneva, CH, Mar. 16-23, 2011, 193 pp.

Wegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Wu C.D., et al., "Efficient algorithm for H.264/AVC intra frame transcoding", 16th IEEE International Conference on Image Processing (ICIP), May 30, 2010, pp. 2856-2859, IEEE, XP031724226, ISBN: 978-1-4244-5308-5.

Chien W-J., et al., "Parsing friendly intra mode coding", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F459_r2, pp. 1-5.

Chuang T-D., et al.,"Luma Intra Prediction Mode Coding", 6. JCT-VC Meeting; 97. Mpeg Meeting; Jul. 14, 2011-Jul. 22, 2011; Torino; (Joint Collaborative Team on Video Coding of ISO/ IEC JTC1/SC29/WG11 and ITU-T SG. 16 ) ; URL: http://wftp3.itu.int/av-arch/jctvc-site/,, No. JCTVC-F062, Jul. 15, 2011 (Jul. 15, 2011), 5 pages, XP030009085.

Cohen R., et al., "Non-CE6: Coding of luma intra prediction modes that are not in the MPM set," Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G359_r2, WG11 No. m21921, 13 pages.

Francois E., et al., "CE6b: Intra mode coding with 4 MPMs and mode ranking", Joint Collaborative Team on Video Coding (JCT-VC) of ITU-T SG16 WP3 and ISO/IEC JTC1/SC29/WG11, 7th Meeting, Geneva, CH, Nov. 21-30, 2011, Document: JCTVC-G243, XP030110227, 8 pages.

Kim C., et al., "Fast H.264 Intra-prediction mode selection using joint spatial and transform domain features", Journal of Visual Communication and Image Representation, vol. 17, 2006, pp. 291-310, XP002667270, Retrieved from the Internet: URL:http://viola.usc.edu/Publication/PDF/2006JNL/Kim-JVCI P-2006-April.pdf [retrieved on 2012-81-12].

(56) References Cited

OTHER PUBLICATIONS

Kumakura T., et al., "Fixing the Number of Mpm Candidates," Joint Collaborative Team on Video Coding (JCT-VC) of ITU-T SG16 WP3 and ISO/IEC JTC1/SC29/WG11,6th Meeting: Torino, IT, Jul. 2011, JCTVC-F340, pp. 1-8.

Seregin V., et al., "Infra mode parsing without access neighbouring information," Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F378_r3, 16 pages.

Sim D-G., et al., "Context-adaptive mode selection for intra-block coding in H.264/MPEG-4 Part 10," Real-Time Imaging, 2005, vol. 11, pp. 1-6.

Tan T.K., et al., "CE14.1: Results for DOCOMO's proposal and cross verification of MediaTek's implementation for the most probable mode signalling for luma," Joint Collaborative Team on Video Coding (JCT-VC) of ITU-T SG16 WP3 and ISO/IEC JTC1/SC29/WG11, 5th Meeting, Geneva, CH, Mar. 16-23, 2011, Document: JCTVC-E131, 8 pages.

Yamamoto T., et al., "Flexible Representation of Intra Prediction Modes," Joint Collaborative Team on Video Coding (JCT-VC) of ITU-T SG16 WP3 and ISO/IEC JTC1/SC29/WG11, 2nd Meeting, Geneva, CH, Jul. 21-28, 2010, Document: JCTVC-B063, 7 pages.

Zou F., et al., "Planar Mode Mapping for Intra Mode Coding," Joint Collaborative Team on Video Coding (JCT-VC) of ITU-T SG16 WP3 and ISO/IEC JTC1/SC29/WG11, 6th Meeting, Torino, IT, Jul. 14-22, 2011, Document: JCTVC-F190_V4, 6 pages.

European Search Report issued in European application No. 17193257 by the European Searching Authority—The Hague, dated Jan. 17, 2018, 12 pp.

Guo M., et al., "CE14 Subtest 1: The Most Probable Mode Signaling for Luma", 5th Meeting: Geneva, Switzerland, Mar. 16-23, 2011, Joint Collaborative Team on Video Coding (JCT-VC) of ITU-T SG16 WP3 and ISO/IEC JTC1/SC29/WG11, JCTVC-E088, Mar. 18, 2011, 4 pages.

Huang Y-H., et al., "Fast Decision of Block Size, Prediction Mode, and Intra Block for H.264 Intra Prediction," IEEE Transactions on Circuits and Systems for Video Technology, Aug. 2010, vol. 20, No. 8, pp. 1122-1132.

Zeng H., et al., "Hierarchical Intra Mode Decision for H.264/AVC," IEEE Transactions on Circuits and Systems for Video Technology, Jun. 2010, vol. 20, No. 6, pp. 907-912.

\* cited by examiner

ENHANCED INTRA-PREDICTION MODE SIGNALING FOR VIDEO CODING USING NEIGHBORING MODE

This application is a continuation of U.S. application Ser. No. 13/491,076, filed 7 Jun. 2012, which relates to and claims priority to U.S. Provisional Application No. 61/495,332, filed 9 Jun. 2011; U.S. Provisional Application No. 61/503,712, filed 1 Jul. 2011; U.S. Provisional Application No. 61/504,664, filed 5 Jul. 2011; and U.S. Provisional Application No. 61/533,118, filed 9 Sep. 2011, the entire contents each of which are hereby incorporated by reference.

TECHNICAL FIELD

This disclosure relates to video coding, and more particularly, to signaling of coding characteristics for coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial (intra-picture) prediction and/or temporal (inter-picture) prediction to reduce or remove redundancy inherent in video sequences. For block-based video coding, a video frame, picture, or slice may be partitioned into video blocks. Each video block can be further partitioned. Video blocks in an intra-coded (I) frame or slice are encoded using spatial prediction with respect to neighboring video blocks in the same frame, picture, or slice. Video blocks in an inter-coded (P or B) frame or slice may use spatial prediction with respect to neighboring macroblocks in the same frame or slice or temporal prediction with respect to other reference frames. As used herein, the terms "pictures" may be referred to as frames, and "reference pictures" may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling intra-prediction modes for video coding. The techniques of this disclosure may improve efficiency for signaling of an intra-prediction encoding mode used to intra-mode encode a block of video data. Video data includes a sequence of frames (or pictures) played in rapid succession to simulate motion. Each of the frames may be divided into blocks. Techniques of this disclosure include fixing a number of most probable intra-prediction mode candidates to greater than or equal to two for each block within a frame. In this manner, there may be a relative improvement in efficiency for parsing in the decoding processing and a reduction in memory usage when using the techniques of this disclosure.

In one example, a method for coding video data, the method comprising determining, for a block of video data, a set of most probable intra-prediction modes such that the set of most probable intra-prediction modes has a size that is equal to a predetermined number that is greater than or equal to two. The method also comprises coding a value representative of an actual intra-prediction mode for the block based at least in part on the set of most probable intra-prediction modes and coding the block using the actual intra-prediction mode.

In another aspect, a device for encoding data comprises a video coder configured to determine, for a block of video data, a set of most probable intra-prediction modes such that the set of most probable intra-prediction modes has a size that is equal to a predetermined number that is greater than or equal to two. The video coder is also configured to code a value representative of an actual intra-prediction mode for the block based at least in part on the set of most probable intra-prediction modes. The video coder is further configured to and code the block using the actual intra-prediction mode.

In another aspect, a computer-readable medium comprises computer-readable storage medium having stored thereon instructions that, when executed, cause a processor of a video coding device to determine, for a block of video data, a set of most probable intra-prediction modes such that the set of most probable intra-prediction modes has a size that is equal to a predetermined number that is greater than or equal to two. The instructions further cause the processor to code a value representative of an actual intra-prediction mode for the block based at least in part on the set of most probable intra-prediction modes and code the block using the actual intra-prediction mode.

In another aspect, a device is provided that comprises means for determining, for a block of video data, a set of most probable intra-prediction modes such that the set of most probable intra-prediction modes has a size that is equal to a predetermined number that is greater than or equal to two. The apparatus also comprises means for coding a value representative of an actual intra-prediction mode for the block based at least in part on the set of most probable intra-prediction modes and means for coding the block using the actual intra-prediction mode.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

This disclosure may also apply to electromagnetic signals carrying information. For example, an electromagnetic signal may comprise information relating to the full pixel support used to interpolate a value for a sub-integer pixel of a reference sample. In some examples, a signal may be generated from or transmitted by a device implementing the techniques described herein. In other examples, this disclosure may apply to signals that may be received at a device implementing the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

In general, this disclosure describes techniques for signaling intra-prediction modes for video coding. The techniques of this disclosure may improve efficiency for signaling of an intra-prediction encoding mode used to intra-encode a block of video data. A video encoder, for example, may include a set of two or more candidate intra-prediction modes for a current block that includes two (or more) most probable intra-prediction modes based on the intra-prediction modes of blocks neighboring the current block. The candidate set may include indexes for the two or more most probable intra-prediction modes. As used herein, "modes" may be used generally to refer to "intra-prediction modes."

In some examples, techniques of this disclosure provide different candidate sets of intra-prediction modes based on the type of video data being predicted. For example, under certain conditions, certain intra-prediction modes may be included as a probable intra-prediction mode when the set of most probable intra-prediction modes includes 3 or more modes, such as a planar or DC mode.

Video data includes a sequence of frames (or pictures) played in rapid succession to simulate motion. Each of the frames may be divided into blocks. As used herein, the terms "frame" and "picture" may be used interchangeably.

Video encoders encode video data by utilizing spatial and temporal redundancy. For example, a video encoder may take advantage of spatial redundancy by predicting a block relative to neighboring, previously coded blocks. Likewise, a video encoder may take advantage of temporal redundancy by predicting a block relative to data of previously coded frames. In particular, the video encoder predicts a current block from data of a spatial neighbor or from data of one or more previously coded frames. The video encoder then calculates a residual value for the block as a difference between the actual value for the block and the predicted value for the block. The video encoder uses prediction data for a coding unit (CU) and transform units (TUs) to represent residual data. The residual data for a block includes pixel-by-pixel difference values in the pixel (or spatial) domain. The video encoder may further transform the residual data, representing the data in the transform domain.

Figure 1:
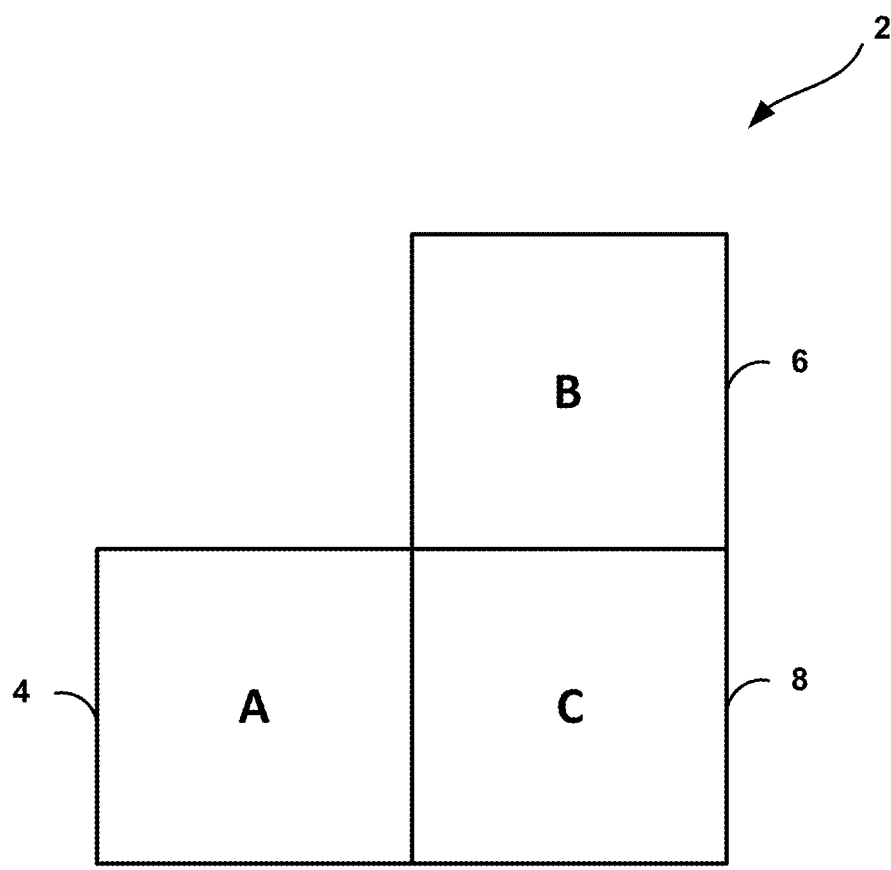
FIG. 1 represents an example of three blocks, including a current block to be coded and two neighboring blocks.

A video decoder may receive coded data for a coded block. The coded data may include a representation of the prediction mode used to encode the block, as well as an indication of partitioning of PUs for the block. In this manner, the video decoder may use the same partitioning of PUs and apply the same prediction mode to decode the block. To reduce the amount of bits consumed in signaling the prediction mode, video coding devices may determine likelihoods of coding prediction modes for a current block based on coding modes of neighboring blocks. FIG. 1 represents an example of three video blocks: A (4), B (6), and C (8). Block C (8) represents a current block being coded, block A (4) represents a left-neighboring, previously coded block relative to block C (8), and block B (6) represents a top-neighboring, previously coded block relative to block C (8).

For purposes of the example of FIG. 1, blocks A (4), B (6), and C (8) are blocks of an intra-predicted picture, frame, or slice. A video coding device, such as a video encoder or a video decoder, may determine two or more likely intra-prediction modes for block C (8) based on the intra-prediction modes of blocks A (4) and B (6). In general, block C is more likely to be predicted using a mode of either block A (4) or block B (6). Typically, when blocks A (4) and B (6) have the same intra-prediction mode, the most likely intra-prediction mode for block C (8) will be the intra-prediction mode of blocks A (4) and B (6). On the other hand, when blocks A (4) and B (6) have different intra-prediction modes, a video coding device must determine whether the prediction mode for block C (8) is more likely to be the intra-prediction mode of block A (4) or the intra-prediction mode of block B (6).

More particularly, in conventional High Efficiency Video Coding (HEVC), a mapping table may be used to map intra-prediction modes to codeword indices. The codeword indices may be mapped by another table to variable length codes (for CAVLC) or binarized values (for CABAC). In addition, for each block, a number of most probable modes may be determined, where the most probable modes may be assigned the smallest indices, where the smallest indices are most probable and thus, coded using fewer bits. In conventional HEVC, the number of most probable modes may vary based on whether blocks A (4) and B (6) have the same or different intra-prediction modes.

This disclosure provides various techniques for improving signaling of intra-prediction modes for video coding. In one example, rather than allowing a number of most probable modes to vary for each block, as discussed above, there may always be a fixed number of most probable modes, which is at least two. While the number of most probable modes may be larger than two, in these techniques, the number of most probable modes is fixed for all blocks in a picture. In other words, a video coding device may be configured to use a predetermined number of most probable modes for all blocks, and the predetermined number may be greater than or equal to two.

In this example, if the intra-prediction modes of blocks A (4) and B (6) are different, and the predetermined number of most probable modes for block C (8) is two, then the two most probable intra-prediction modes for block C (8) may correspond to the intra-prediction modes of blocks A (4) and B (6). However, if the intra-prediction modes of blocks A (4) and B (6) are the same, the video coding device may add a second most probable mode to the set of most probable modes.

In some examples, if the intra-prediction modes of blocks A (4) and B (6) are the same and the mode is a mode other than planar mode, then the second most probable mode for block C (8) is selected as planar mode. On the other hand, if the intra-prediction modes of blocks A (4) and B (6) are the same and the mode is planar mode, then the second most probable mode for block C (8) is selected as DC mode. In some examples, planar mode may always be mapped to index value 0.

For examples where there are more than two most probable modes in the predetermined number of most probable modes, these modes may correspond to intra-prediction modes that are similar in direction to the directions of the intra-prediction directions for blocks A (4) and B (6).

The examples discussed above have referred to intra-prediction modes for luminance data. For chrominance data, this disclosure proposes fixing the available number of intra-prediction modes such that certain intra-prediction modes are always candidate intra-prediction modes, in some examples. Conventionally, six modes are available for chrominance blocks: vertical mode, horizontal mode, DC mode, planar mode, luma signal based prediction mode, and inheritance of luma prediction mode. Inheritance of luma prediction mode allows the chrominance mode to inherit the mode of the corresponding luminance block. Because of this, two symbols, or index values, may be assigned to the same mode, e.g., when the luminance block is predicted using vertical, horizontal, DC, or planar mode. Effectively, this means that the chrominance block may have only five possible modes, rather than six. Thus, there is a redundant signal for at least one mode in such situations.

This disclosure proposes adding another intra-prediction mode for chrominance blocks when a redundant signal is available, in some examples. Assuming that the luminance block is predicted using one of horizontal, vertical, DC, or planar mode, the mode corresponding to the index value that would otherwise indicate the inheritance of the luma intra-prediction mode may be mapped to a different mode than the mode used for the corresponding luminance block. This additional mode may correspond to a mode having a similar directionality to the mode of the corresponding luminance block that is not otherwise available for the chrominance block.

According to techniques of the present disclosure, an example derivation process for luma intra-prediction modes may include the following inputs: a luma location (xB, yB) specifying a top-left luma sample of a current block relative to a top-left luma sample of a current picture of the current block; a variable, log 2TrafoSize, specifying the size of the current prediction unit; and, if available, variable arrays, IntraPredMode, that are derived for adjacent coding units previously decoded in decoding order. The output of this derivation process may be denoted with the variable IntraPredMode[xB][yB].

Table 1 specifies an example of a number of luma intra-prediction modes, intraPredModeNum, depending on log 2TrafoSize, the size of a current prediction block.

TABLE 1

Specification of intraPredModeNum

| log2TrafoSize | intraPredModeNum |
|---|---|
| 2 | 17 |
| 3 | 34 |
| 4 | 34 |
| 5 | 34 |
| 6 | 3 |

The variable candModeList[x] defines the intra-prediction modes that are available. The variable NumMPMCand defines the number of most probable mode (MPM) candidates. According to techniques described herein, the number of MPM candidates is fixed for all blocks in a picture or frame. A video encoder may be configured to signal a value representative of the number of MPM candidates in, e.g., a sequence parameter set (SPS) for a sequence of pictures, a picture parameter set (PPS) for an individual picture, or other data structure. Likewise, a video decoder may determine the number of MPM candidates by interpreting such signaled values.

The candModeList[x] and NumMPMCand can be derived based on the presence and values of candIntraPredModeN. If both candIntraPredModeN are not available, then the index value 2 is assigned to candModeList[0] and NumMPMCand is set equal to 1. Otherwise, if only one candIntraPredModeN is available, then this candIntraPredModeN is assigned to candModeList[0] and NumMPMCand is set equal to 1. Likewise, if both candIntraPredModeN are the same, one of the candIntraPredModeN is assigned to candModeList[0] and NumMPMCand is set equal to 1. If both candIntraPredModeN are different, NumMPMCand is set equal to 2 and both candIntraPredModeN are assigned to the candidate modes list, with the smaller of the two candidates at candModeList[0] and the larger at candModeList[1]. Table 2 summarizes how candModeList[x] and NumMPMCand may be derived.

TABLE 2

Specification of intraPredModeNum

| candIntraPredModeN | candModeList[0] | NumMPMCand |
|---|---|---|
| Both not available | 2 | 1 |
| Only one available | candIntraPredModeN | 1 |

TABLE 2-continued

Specification of intraPredModeNum

| candIntraPredModeN | candModeList[0] | NumMPMCand |
|---|---|---|
| Both are the same | candIntraPredModeN | 1 |
| Both are different | Smaller candIntraPredModeN set as candModeList[0] and larger candIntraPredModeN set as candModeList[1] | 2 |

IntraPredMode[xB][yB] can be derived by applying the following procedure. If prev_intra_pred_flag[xB][yB] is true, IntraPredMode[xB][yB] is set equal to candModeList[mpm_idx[xB][yB]]. Otherwise, IntraPredMode[xB][yB] is derived by applying the following equations:

$$\text{IntraPredMode}[xB][yB] = \text{rem\_intra\_luma\_pred\_mode}$$
$$\text{for } (cIdx=0; cIdx<\text{NumMPMCand}; cIdx++) \quad (1)$$

$$\text{if } (\text{IntraPredMode}[xB][yB] \geq \text{candModeList}[cIdx]),$$
$$\text{then IntraPredMode}[xB][yB]++ \quad (2)$$

In these examples, the variable rem_intra_pred_mode is signaled by fixed length binarization with one context. The variable cIdx specifies the chroma component of the current block.

For chroma intra-prediction mode signaling, the current HEVC allows six modes including: vertical, horizontal, DC, planar, luma signal based chroma prediction, and inheritance of luma prediction mode. Among all of these modes, the inheritance of luma prediction mode means that the chroma prediction direction is the same as the luma prediction direction. Because of this, some redundant symbols are removed if the luma mode is vertical, horizontal, DC, or planar. As a result, the code tables have different sizes for different luma prediction mode.

This process may require extra decoding process in parsing and extra memory. First, in order to parse intra_pred_mode, the decoder has to decode intra_pred_mode of the neighboring blocks A and B in order to determine candIntraPredModeA and candIntraPredModeB. Furthermore, the decoder has to determine candModeList and NumMPMC. The extra memory is required because six bits are needed in a decoder line buffer for every 4×4 block in order to store intra_pred_mode. Further, the coding of rem_intra_pred_mode is not efficient due to fixed length binarization and its context modeling. Moreover, having different sizes of code tables for the chroma prediction mode requires having prior knowledge of luma prediction mode before the parsing of the chroma prediction mode.

Figure 2:
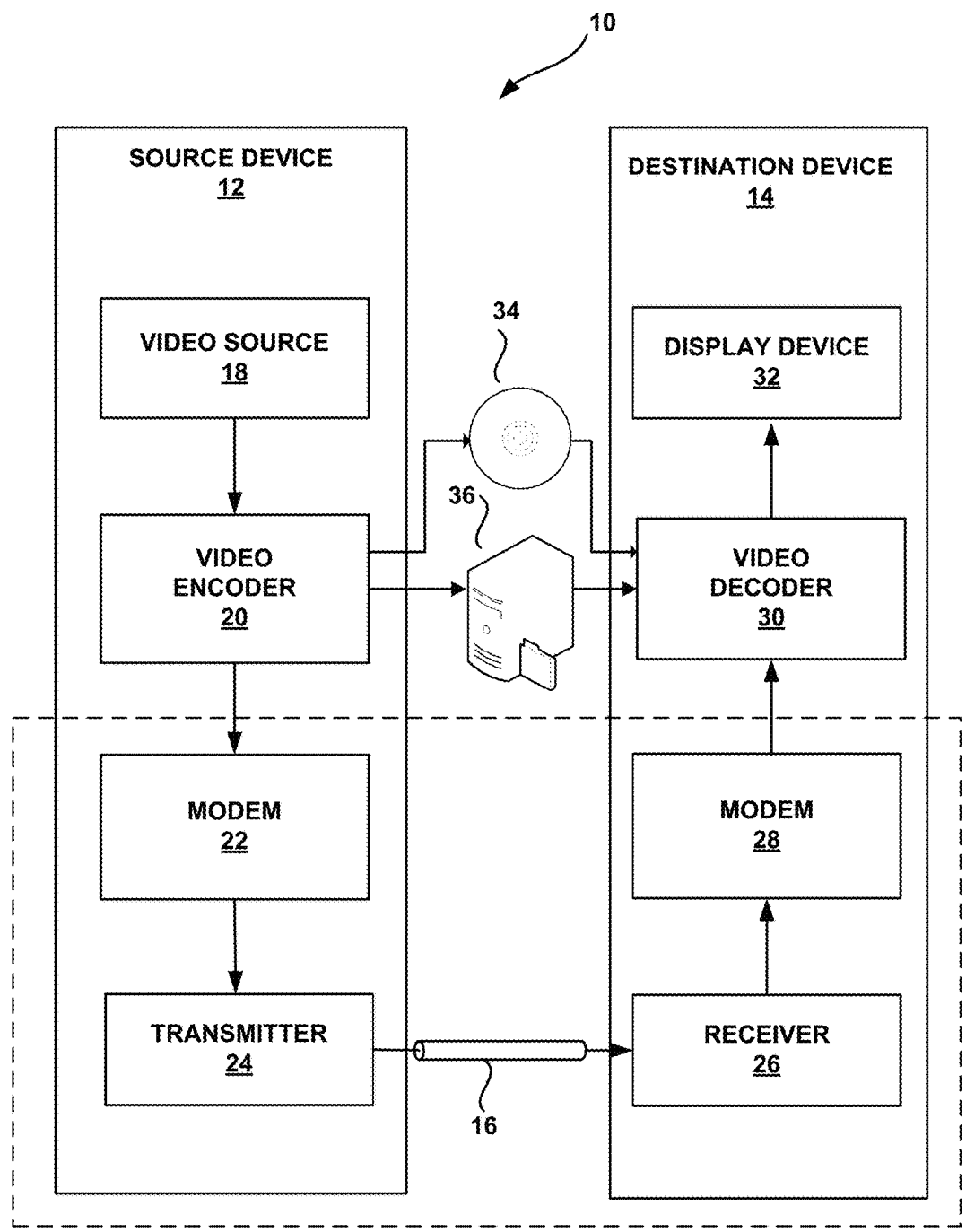
FIG. 2 is a block diagram illustrating an example video encoding and decoding system that may utilize techniques for coding syntax data representative of intra-prediction modes for blocks of video data.

FIG. 2 is a block diagram illustrating an example video encoding and decoding system 10 that may be used to implement the various techniques described herein. As shown in FIG. 2, system 10 includes a source device 12 that transmits encoded video data to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data. Moreover, communication channel 16 is intended to represent just one of many ways in which a video encoding device might transmit data to a video decoding device. For example, in other configurations of system 10, source device 12 might generate encoded video for decoding by destination device 14 and store the encoded video on a storage medium or a file server, such that the encoded video may be accessed by destination device 14 as desired.

In the example of FIG. 2, source device 12 includes a video source 18, video encoder 20, a modulator/demodulator (modem) 22, and a transmitter 24. Destination device 14 includes a receiver 26, a modem 28, a video decoder 30, and a display device 32. In accordance with this disclosure, video encoder 20 of source device 12 may be configured to apply the techniques for coding syntax data representative of intra-prediction modes for blocks of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques for coding syntax data representative of intra-prediction modes for blocks of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12 and 14 may operate in a substantially symmetrical manner such that each of devices 12 and 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding syntax data representative of intra-prediction modes for blocks of video data. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20, for example, may include a fixed set of most probable candidate intra-prediction modes for each block in a frame, or each block within each frame within each GOP. The fixed set of MPM candidates may include two (or more) most probable intra-prediction modes based on the intra-prediction modes of blocks neighboring a current block. Video encoder 20 typically operates on video blocks within individual video frames in order to encode the video data. A video block may correspond to a block, a CU, a PU, or a TU. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra-prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP) also referred to as a sequence, or another independently decodable unit defined according to applicable coding techniques.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes, e.g., based on the size of a block being intra-prediction coded.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, a prediction unit (PU), or a transform unit (TU).

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. For example, in accordance with the techniques of this disclosure, a fixed set of most probable candidate intra-prediction modes for each PU in a CU. The fixed set of MPM candidates may include two or more candidate intra-prediction modes based on the intra-prediction modes of blocks neighboring a current block. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. A set of residual values may be transformed, scanned, and quantized to define a set of transform coefficients. The TU defines a data structure that includes the transform coefficients. A TU is not necessarily limited to the size of a PU. Thus, TUs may be larger or smaller than corresponding PUs for the same CU. In some examples, the maximum size of a TU may correspond to the size of the corresponding CU.

In accordance with the techniques of this disclosure, video encoder 20 may encode certain blocks of video data using intra-prediction mode encoding, and provide information indicating a selected intra-prediction mode used to encode the block. Video encoder 20 may intra-prediction encode blocks of any type of frame or slice using an intra-prediction mode, e.g., I-frames or I-slices, in addition to P-frames or P-slices and B-frames or B-slices. When video encoder 20 determines that a block should be intra-prediction mode encoded, video encoder 20 may perform a rate-distortion analysis to select a most appropriate intra-prediction encoding mode. For example, video encoder 20 may calculate rate-distortion values for one or more intra-prediction encoding modes, and select one of the modes having acceptable rate-distortion characteristics.

Video encoder 20 may also be configured to determine an encoding context for the block. The context may include various characteristics of the block such as, for example, a size of the block, which may be determined in terms of pixel dimensions, prediction unit (PU) type such as, in the example of HEVC, 2N×2N, N×2N, 2N×N, N×N, short-distance intra-prediction (SDIP) types such as 2N×N/2, N/2×2N, 2N×1, 1×2N, a macroblock type in the example of H.264, a coding unit (CU) depth for the block, or other measurements of size for a block of video data. In some examples, the context may correspond to how any or all of intra-prediction modes for an above-neighboring block, a left-neighboring block, an above-left neighboring block, an above-right neighboring block, or other neighboring blocks. In some examples, the context may include both intra-prediction modes for one or more blocks as well as size information for the current block being encoded.

In any case, video encoder 20 may include configuration data that maps the context for the block to various coding characteristics for the current block. For example, based on the context for the block, the configuration data may indicate one or more most probable intra-prediction modes. In accordance with the techniques of this disclosure, video encoder 20 may determine one or more most probable encoding modes for a block, based on an encoding context for the block, as well as an intra-mode index table and a codeword table based on the encoding context for the block. The codeword table may comprise a variable length code (VLC) table for CAVCL or a binarization table for context-adaptive binary arithmetic coding (CABAC). In CABAC, video encoder 20 may further binary arithmetic code a binarized value selected from the table. After selecting the intra-prediction mode to use to encode the block, video encoder 20 may determine whether the selected intra-prediction mode is the most probable intra-prediction mode for the block. If the selected mode is the most probable mode, video encoder 20 may signal the intra-prediction mode using a single bit codeword (e.g., '0' or '1'). Assuming without loss of generality that the single bit codeword has a value of '0,' and that the codeword table is a VLC table, other codewords in the VLC table may begin with '1,' to avoid violating the prefix requirements of VLC (that is, that no codeword in the table is a prefix of another codeword in the table). In examples where the selected intra-prediction mode is not one of the most probable modes, video encoder 20 may signal the actual intra-prediction mode. In some examples, a flag may be set indicating that the actual intra-prediction mode is not included in the candidate list of most probable intra-prediction modes.

Video encoder 20 may, in some examples, be configured to begin analysis for selection of an intra-prediction encoding mode with the most probable encoding mode, based on the context. When the most probable encoding mode achieves suitable rate-distortion characteristics, in some examples, video encoder 20 may select the most probable encoding mode. In other examples, video encoder 20 need not begin the selection process with the most probable encoding mode.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video decoder 30 may ultimately receive encoded video data, e.g., from modem 28 and receiver 26. In accordance with the techniques of this disclosure, video decoder 30 may receive a codeword representative of an intra-prediction mode used to encode a block of video data. Video decoder 30 may be configured to determine a coding context for the block in a manner substantially similar to video encoder 20. Moreover, video decoder 30 may include similar configuration data to video encoder 20, e.g., indications of a most probable encoding mode, an intra-prediction mode index table, and a VLC table for each coding context.

When using one most probable intra-prediction mode, if the codeword comprises a single-bit codeword, video decoder 30 may determine that the intra-prediction mode used to encode the coded block was the most probable intra-prediction mode. Of course, as discussed above, the single-bit codeword should not be a prefix of the codewords of the VLC table. Accordingly, if the received codeword is not the single-bit codeword, video decoder 30 may determine the intra-prediction mode used to encode the block of video data in a manner generally reciprocal to that of video encoder 20.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 3:
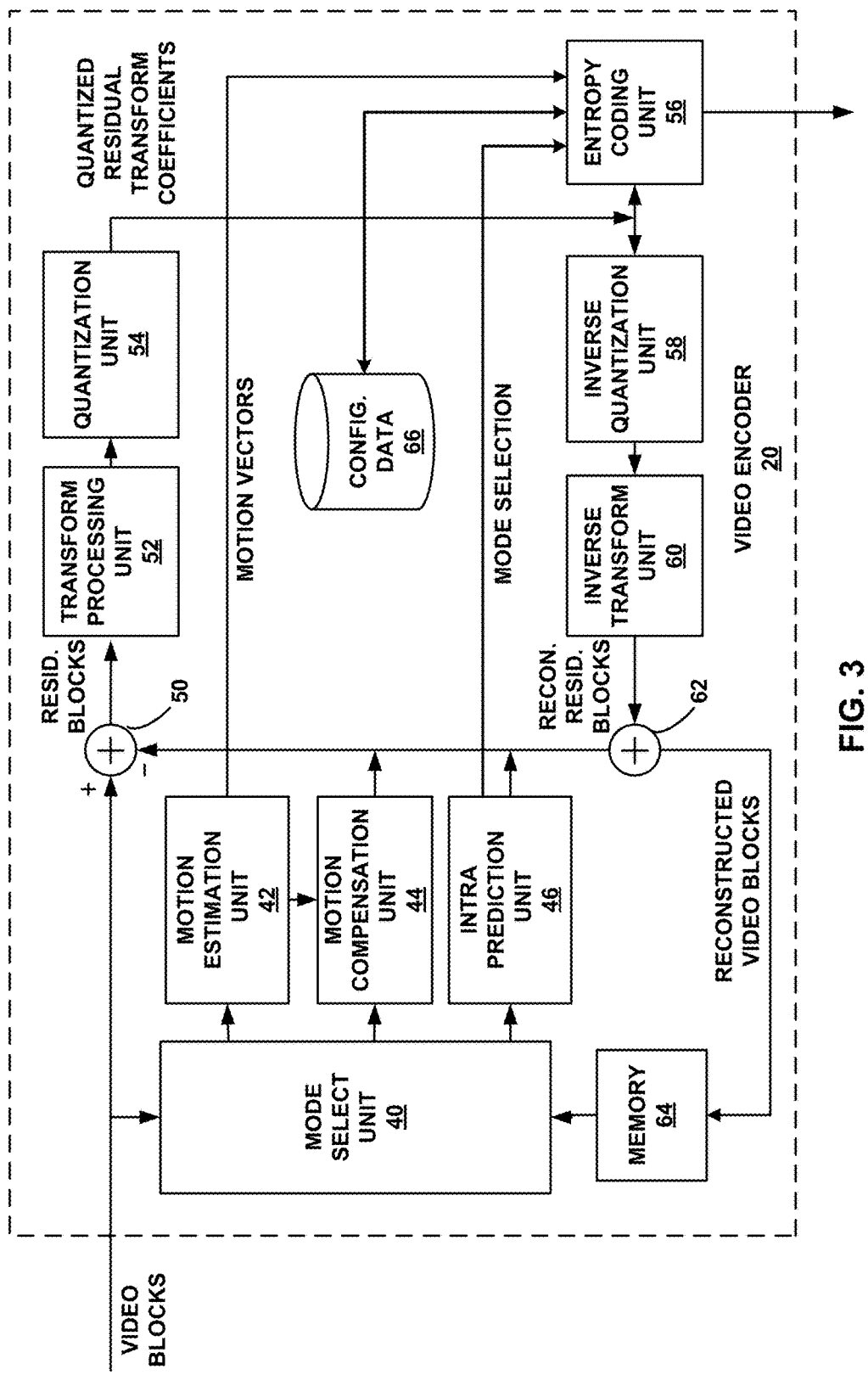
FIG. 3 is a block diagram illustrating an example of a video encoder that may implement techniques for coding information indicative of an intra-prediction mode.

FIG. 3 is a block diagram illustrating an example of video encoder 20 that may implement techniques for coding information indicative of an intra-prediction mode, and which may be used to implement the various techniques described above. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 3, it should be understood that video encoder 20 may further include components for intra-mode encoding. However, such components are not illustrated for the sake of brevity and clarity.

As shown in FIG. 3, video encoder 20 receives a current video block within a video frame to be encoded. In the example of FIG. 2, video encoder 20 includes motion compensation unit 44, motion estimation unit 42, memory 64, summer 50, transform processing unit 52, quantization unit 54, and entropy coding unit 56. For video block reconstruction, video encoder 20 also includes inverse quantization unit 58, inverse transform unit 60, and summer 62. A deblocking filter may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results and based on a frame or slice type for the frame or slice including a current block being coded, and provides the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists.

Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 sends the calculated motion vector to entropy coding unit 56 and motion compensation unit 44. The reference frame block identified by a motion vector may be referred to as a predictive block. Motion compensation unit 44 may calculate prediction data based on the inter-predictive block.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. As illustrated in FIG. 3, video encoder 20 may include configuration data 66, which may include a plurality of intra-prediction mode index tables and a plurality of codeword index tables (also referred to as codeword mapping tables), definitions of encoding contexts for various blocks, and indications of a most probable intra-prediction mode, an intra-prediction mode index table, and a codeword index table to use for each of the contexts.

In examples where the number of intra-prediction modes varies based on block size, configuration data 66 may include different tables for different sizes of blocks. Accordingly, a context for encoding an indication of an intra-prediction mode used to encode a block may include a size of the block, as well as coding modes used to encode neighboring blocks. Entropy coding unit 56 may select the mode index table and codeword mapping table used to select a codeword representative of the selected intra-prediction mode used to encode the block based on the context for the block. Moreover, the mode index tables for blocks of a particular size may have numbers of entries equal to the number of intra-prediction modes for blocks of that size. Thus, mode index tables for blocks of size 4×4 may have 17 entries, mode index tables for blocks of size 8×8, 16×16, and 32×32 may have 34 entries, and mode index tables for blocks of size 64×64 may have 5 entries. Other sizes of blocks, e.g., 128×128, may also have a determined number of intra-prediction modes available as well.

The intra-prediction modes available for blocks of size 8×8, 16×16, and 32×32 may be the same, and therefore, the same mode index tables may be used for blocks of sizes 8×8, 16×16, and 32×32. Although the same modes may be possible for blocks of these sizes, the probability of using a particular mode to encode a block may vary based on the size of the block. Accordingly, entropy coding unit 56 may determine a codeword mapping table for a particular mode index table based on the size of the block for which an intra-prediction mode is to be signaled, in some examples.

For example, video encoder 20 determines the set of most probable modes. Intra-prediction unit 46 may determine an actual intra-prediction mode of neighboring blocks of the current block. Video encoder 20 may also be configured to determine a first intra-prediction mode for a left-neighboring block of the block, determine a second intra-prediction mode for an above-neighboring block of the block, and when the first intra-prediction mode is different than the second intra-prediction mode, include both the first intra-prediction mode and the second intra-prediction mode in the set of most probable intra-prediction modes. For example, referring to FIG. 1, intra-prediction unit 46 may determine actual intra-prediction modes used for neighboring blocks A (4) and B (6) with respect to current block C (8). Based on the intra-prediction modes used for neighboring blocks A (4) and B (6), intra-prediction unit 46 determines the most probable modes for block C (8). Intra-prediction unit 46 may compare the actual intra-prediction mode used for neighboring block A (4) to the actual intra-prediction mode used for neighboring block B (6). Based on this comparison, a particular intra-prediction mode, such as planar mode, may be included in the set of most probable modes for block C (8). Intra-prediction unit 46 may also determine an actual mode to use to intra-predict current block C (8).

When the first intra-prediction mode is the same as the second intra-prediction mode, and when the first and second intra-prediction modes comprise a mode other than a planar mode, intra-prediction unit 46 includes the planar mode in the set of most probable intra-prediction modes. In another example, when the first intra-prediction mode is the same as the second intra-prediction mode, and when the first and second intra-prediction modes comprise a planar mode, intra-prediction unit 46 includes the planar mode and a DC mode in the set of most probable intra-prediction modes.

In another example, when the current block comprises a luminance block, video encoder 20 determines, for a chrominance block corresponding to the luminance block, a mapping of a set of values to a set of intra-prediction modes, the set of intra-prediction modes comprising horizontal mode, vertical mode, planar mode, DC mode, and luma signal prediction mode when the actual intra-prediction mode for the luminance block comprises a mode other than horizontal mode, vertical mode, planar mode, and DC mode, the set of intra-prediction modes further comprises a reuse of luma intra-prediction mode mapped from a first value of the set of values. When the actual intra-prediction mode for the luminance block comprises one of horizontal mode, vertical mode, planar mode, and DC mode, the set of intra-prediction modes further comprises a mode other than horizontal mode, vertical mode, planar mode, and DC mode mapped from the first value of the set of values, video encoder 20 encodes a value representative of an actual intra-prediction mode for the chrominance block based on the mapping of the set of values to the set of modes.

In another example, intra-prediction unit 46 determines a prediction direction of the actual intra-prediction mode and includes at least one intra-prediction mode having a prediction direction closest to the prediction direction of the actual intra-prediction mode in the set of most probable intra-prediction modes.

In yet another example, when the size of the set of most probable intra-prediction modes is equal to three, intra-prediction unit 46 determine a prediction direction of a first intra-prediction mode and compares the prediction direction of the first intra-prediction mode to prediction directions of one or more other available intra-prediction modes. Intra-prediction unit 46 includes the first intra-prediction mode in the set of most probable intra-prediction modes. Further, based on the comparison, intra-prediction unit 46 includes a second and third intra-prediction mode of the one or more available intra-prediction modes in the set of most probable intra-prediction modes, wherein the second and third intra-prediction modes have prediction directions determined to be closest to the prediction direction of the first intra-prediction mode.

After predicting a current block, e.g., using intra-prediction or inter-prediction, video encoder 20 may form a residual video block by subtracting the prediction data calculated by motion compensation unit 44 or intra-prediction unit 46 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks and/or block sizes.

In some cases, entropy coding unit 56 or another unit of video encoder 20 may be configured to perform other coding functions, in addition to entropy coding and coding of the intra-prediction mode as described above. For example, entropy coding unit 56 may be configured to determine coded block pattern (CBP) values for the blocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, video encoder 20 represents an example of a video encoder configured to determine one or more most probable intra-prediction encoding modes for a current block of video data based on an encoding context for the current block, select a table of codewords based on the context for the current block, wherein the table of codewords comprises a plurality of variable length codewords corresponding to codeword indexes that correspond to intra-prediction modes other than the most probable intra-prediction mode(s) based on the context, encode the current block using one of the intra-prediction modes other than the most probable intra-prediction encoding mode, determine one of the codeword indexes that corresponds to the one of the intra-prediction modes using the table of codewords, and output a codeword from the selected table of codewords, wherein the codeword corresponds to the one of the codeword indexes.

Figure 4:
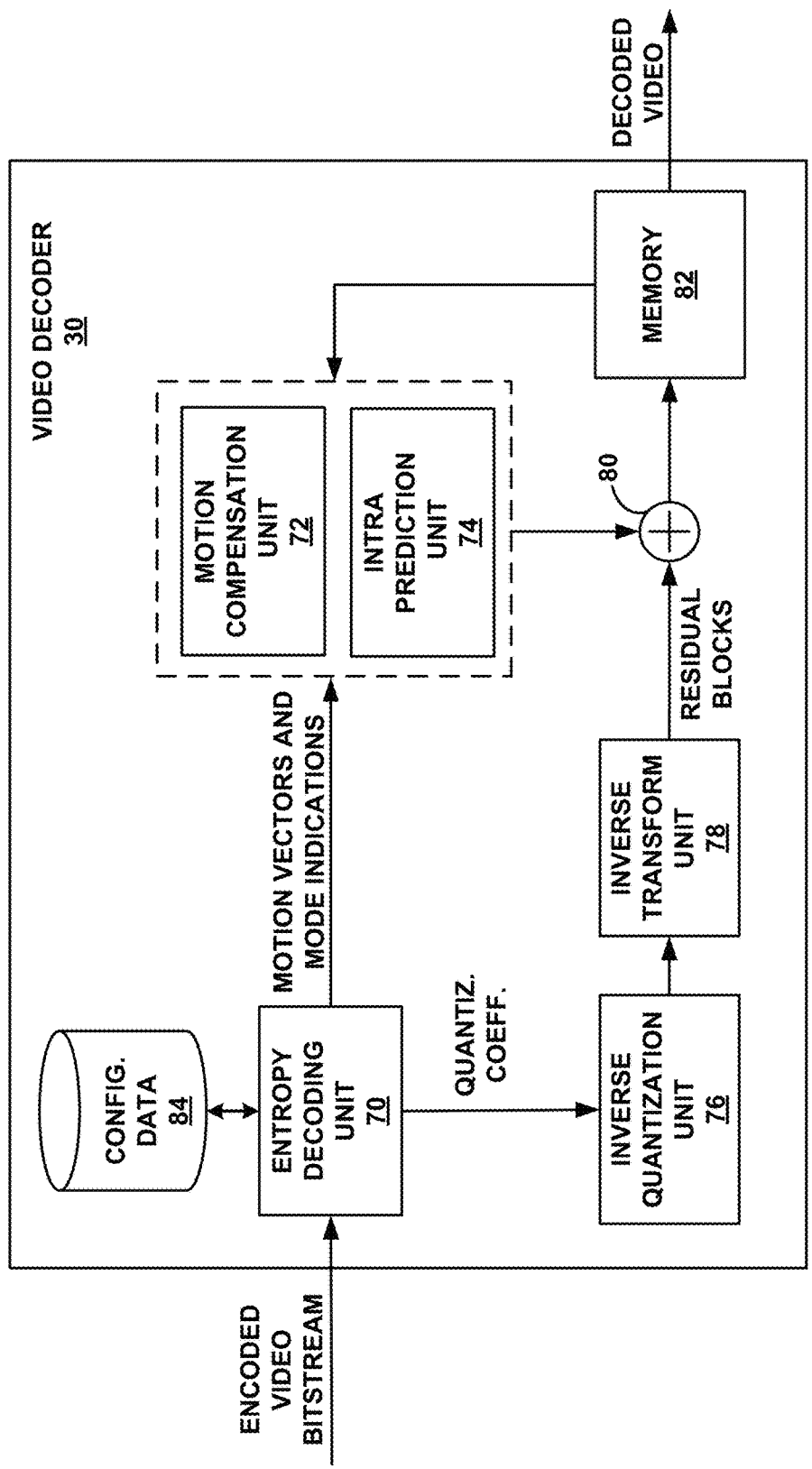
FIG. 4 is a block diagram illustrating an example of a video decoder, which decodes an encoded video sequence.

FIG. 4 is a block diagram illustrating an example of video decoder 30, which decodes an encoded video sequence, and which may be used to implement the various techniques described herein. In the example of FIG. 3, video decoder 30 includes an entropy decoding unit 70, motion compensation unit 72, intra-prediction unit 74, inverse quantization unit 76, inverse transformation unit 78, memory 82 and summer 80. Video decoder 30 may, in some examples, perform a decoding pass generally reciprocal to the encoding pass described with respect to video encoder 20 (FIG. 3). Motion compensation unit 72 may generate prediction data based on motion vectors received from entropy decoding unit 70.

Motion compensation unit 72 may use motion vectors received in the bitstream to identify a prediction block in reference frames in reference frame store 82. Intra-prediction unit 74 may use intra-prediction modes received in the bitstream to form a prediction block from spatially adjacent blocks. In particular, video decoder 30, in the example of FIG. 4, includes configuration data 84. Configuration data 84 is substantially similar to configuration data 66 of FIG. 3, in that configuration data 84 includes information describing contexts for intra-predicted blocks, as well as one of a plurality of intra-prediction index mapping tables to use for each context, one of a plurality of codeword index (or codeword mapping) tables to use for each context, and a most probable intra-prediction mode for each context.

Entropy decoding unit 70 may receive a codeword representative of an intra-prediction mode to use to decode an encoded block of video data. In some examples, the codeword may be a VLC codeword or an entropy coded binarized value that is first entropy decoded using CABAC. Entropy decoding unit 70 may determine a context for the encoded block, e.g., based on intra-prediction modes for a left-neighboring and top-neighboring block to the encoded block and/or a size for the encoded block. That is, the context may correspond to the two or more most probable modes. The codewords provide an indication of the actual intra-prediction mode for the current block. For example, the codeword indicates whether the actual intra-prediction mode is one of the most probable modes, and if not, intra-prediction unit 74 provides an indication of the actual intra-prediction mode. Based on the context, entropy decoding unit 70 may determine one or more most probable intra-prediction modes to use to decode the block, as well as an intra-prediction index table and a codeword index table to use to determine the actual intra-prediction mode to use to decode the block.

Intra-prediction unit 74 may use the intra-prediction mode, corresponding to the indication, to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction data for the encoded block. In any case, motion compensation unit 72 or intra-prediction unit 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter QPY calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 2).

In this manner, video decoder 30 of FIG. 4 represents an example of a video decoder configured to determine one or more most probable intra-prediction modes for a coded block of video data based on a context for the current block, select a table of codewords based on the context for the current block, wherein the table of codewords comprises a plurality of variable length codewords corresponding to codeword indexes that correspond to intra-prediction modes other than the most probable intra-prediction mode(s) based on the context, determine one of the codeword indexes that corresponds to a received codeword using the table of codewords, select an intra-prediction mode other than the most probable intra-prediction mode to use to decode the coded block, wherein the selected intra-prediction mode corresponds to the determined one of the codeword indexes; and decode the current block using the selected intra-prediction mode.

According to techniques described herein, video decoder 30 determines the set of most probable modes for a current video block. Intra-prediction unit 74 may determine an actual intra-prediction mode of neighboring blocks of the current block. Video decoder 30 may also be configured to determine a first intra-prediction mode for a left-neighboring block of the block, determine a second intra-prediction mode for an above-neighboring block of the block, and when the first intra-prediction mode is different than the second intra-prediction mode, include both the first intra-prediction mode and the second intra-prediction mode in the set of most probable intra-prediction modes. For example, referring to FIG. 1, intra-prediction unit 74 may determine actual intra-prediction modes used for neighboring blocks A (4) and B (6) with respect to current block C (8). Based on the intra-prediction modes used for neighboring blocks A (4) and B (6), intra-prediction unit 74 determines the most probable modes for block C (8). Intra-prediction unit 74 may compare the actual intra-prediction mode used for neighboring block A (4) to the actual intra-prediction mode used for neighboring block B (6). Based on this comparison, a particular intra-prediction mode, such as planar mode, may be included in the set of most probable modes for block C (8). Intra-prediction unit 74 may also determine an actual mode to use to intra-predict current block C (8).

When the first intra-prediction mode is the same as the second intra-prediction mode, and when the first and second intra-prediction modes comprise a mode other than a planar mode, intra-prediction unit 74 includes the planar mode in the set of most probable intra-prediction modes. In another example, when the first intra-prediction mode is the same as the second intra-prediction mode, and when the first and second intra-prediction modes comprise a planar mode, intra-prediction unit 74 includes the planar mode and a DC mode in the set of most probable intra-prediction modes.

In another example, when the current block comprises a luminance block, video decoder 30 determines, for a chrominance block corresponding to the luminance block, a mapping of a set of values to a set of intra-prediction modes, the set of intra-prediction modes comprising horizontal mode, vertical mode, planar mode, DC mode, and luma signal prediction mode when the actual intra-prediction mode for the luminance block comprises a mode other than horizontal mode, vertical mode, planar mode, and DC mode, the set of intra-prediction modes further comprises a reuse of luma intra-prediction mode mapped from a first value of the set of values. When the actual intra-prediction mode for the luminance block comprises one of horizontal mode, vertical mode, planar mode, and DC mode, the set of intra-prediction modes further comprises a mode other than horizontal mode, vertical mode, planar mode, and DC mode mapped from the first value of the set of values, video decoder 30 decodes a value representative of an actual intra-prediction mode for the chrominance block based on the mapping of the set of values to the set of modes.

In another example, intra-prediction unit 74 determines a prediction direction of the actual intra-prediction mode of the current block and includes at least one intra-prediction mode having a prediction direction closest to the prediction direction of the actual intra-prediction mode in the set of most probable intra-prediction modes.

In yet another example, when the size of the set of most probable intra-prediction modes is equal to three, intra-prediction unit 74 determines a prediction direction of a first intra-prediction mode and compares the prediction direction of the first intra-prediction mode to prediction directions of one or more other available intra-prediction modes. Intra-prediction unit 74 includes the first intra-prediction mode in the set of most probable intra-prediction modes. Further, based on the comparison, intra-prediction unit 74 includes a second and third intra-prediction mode of the one or more available intra-prediction modes in the set of most probable intra-prediction modes, wherein the second and third intra-prediction modes have prediction directions determined to be closest to the prediction direction of the first intra-prediction mode.

Figure 5:
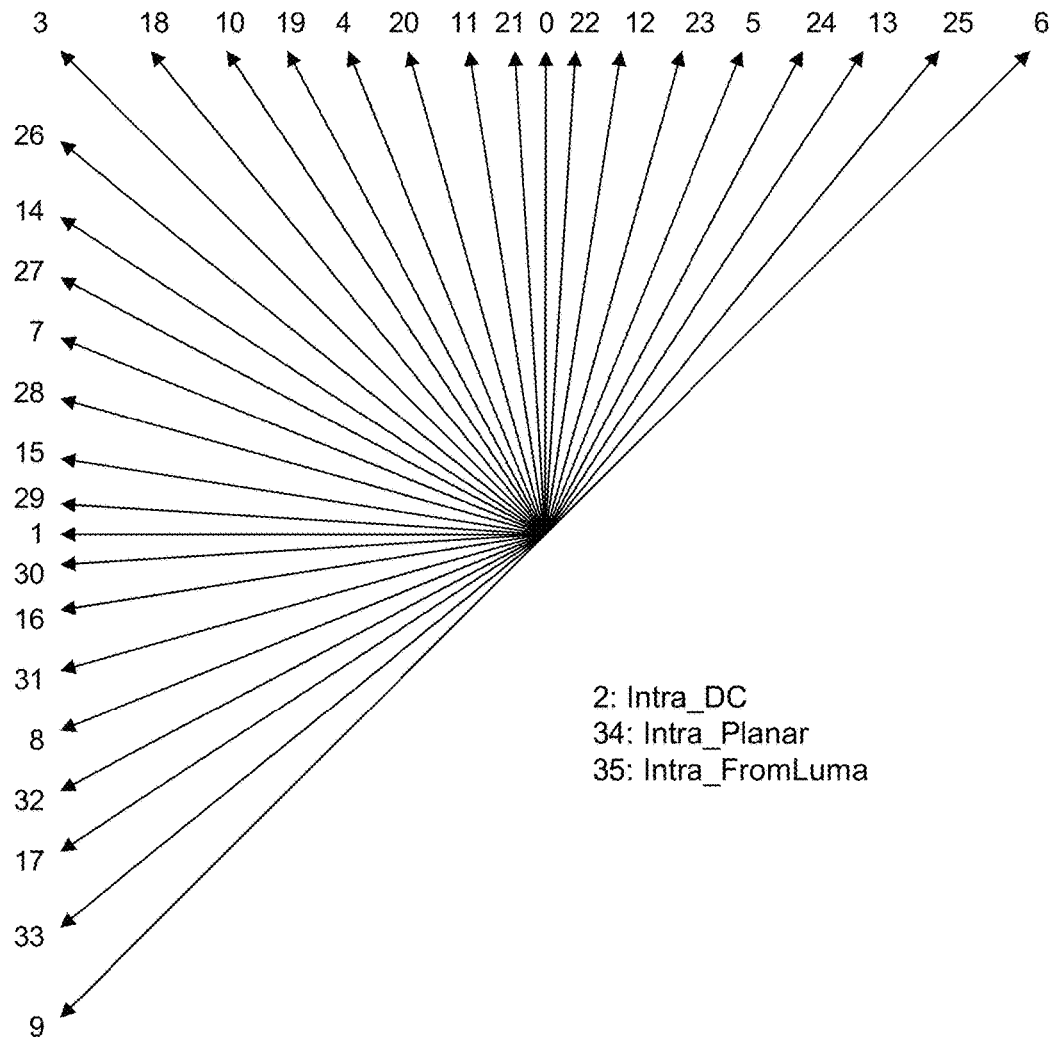
FIG. 5 is a diagram illustrating one example of 35 intra-prediction modes and their corresponding prediction directions.

FIG. 5 is a diagram illustrating one example of 35 intra-prediction modes and their corresponding prediction directions. As defined in this example, each of 35 index values are uniquely assigned to different intra-prediction modes. In this example, index value 2 is mapped to the DC intra-prediction mode, index value 34 is mapped to the planar intra-prediction mode, and index value 35 is mapped to the from_luma intra-prediction mode. The rest of the index values are assigned to the available set of different intra-prediction modes, each having a prediction direction. For example, intra-prediction unit 46 of video encoder 20 may provide one of five values for a syntax element that indicates the actual intra-prediction mode used to encode a luma block. Similarly, intra-prediction unit 46 of video encoder 20 may provide one of six values for a syntax element that indicates the actual intra-prediction mode used to encode a chroma block. The six values may be one of the five values used for the luma block, plus a value indicating an imitation of the intra-prediction mode that was used to code the corresponding luma block.

For example, the intra-prediction mode mapped to index value 0 has an upward prediction direction with respect to the current block being coded. That is, the pixels used to predict a current block come from above the current block when the mode mapped to index value 0 is selected. For examples where the intra-prediction mode number is 34, the intra-prediction modes having prediction directions closest to the intra-prediction mode mapped to index value 0 are the intra-prediction modes mapped to index values 21 and 22. For examples where the intra-prediction mode number is 17, the intra-prediction modes having prediction directions closest to the intra-prediction mode mapped to index value 0 are the intra-prediction modes mapped to index values 11 and 12, because the index values 21 and 22 are not available for the set of 17 intra-prediction modes.

In an alternate numbering scheme, intra_planar mode may correspond to mode 0, in which case the mode number of all others modes would be increased by 1. Some of the tables used throughout this disclosure generally correspond to this alternate numbering scheme. It should be clear, however, to one of ordinary skill in the art that the techniques of this disclosure are not limited to one particular numbering scheme.

Figure 6:
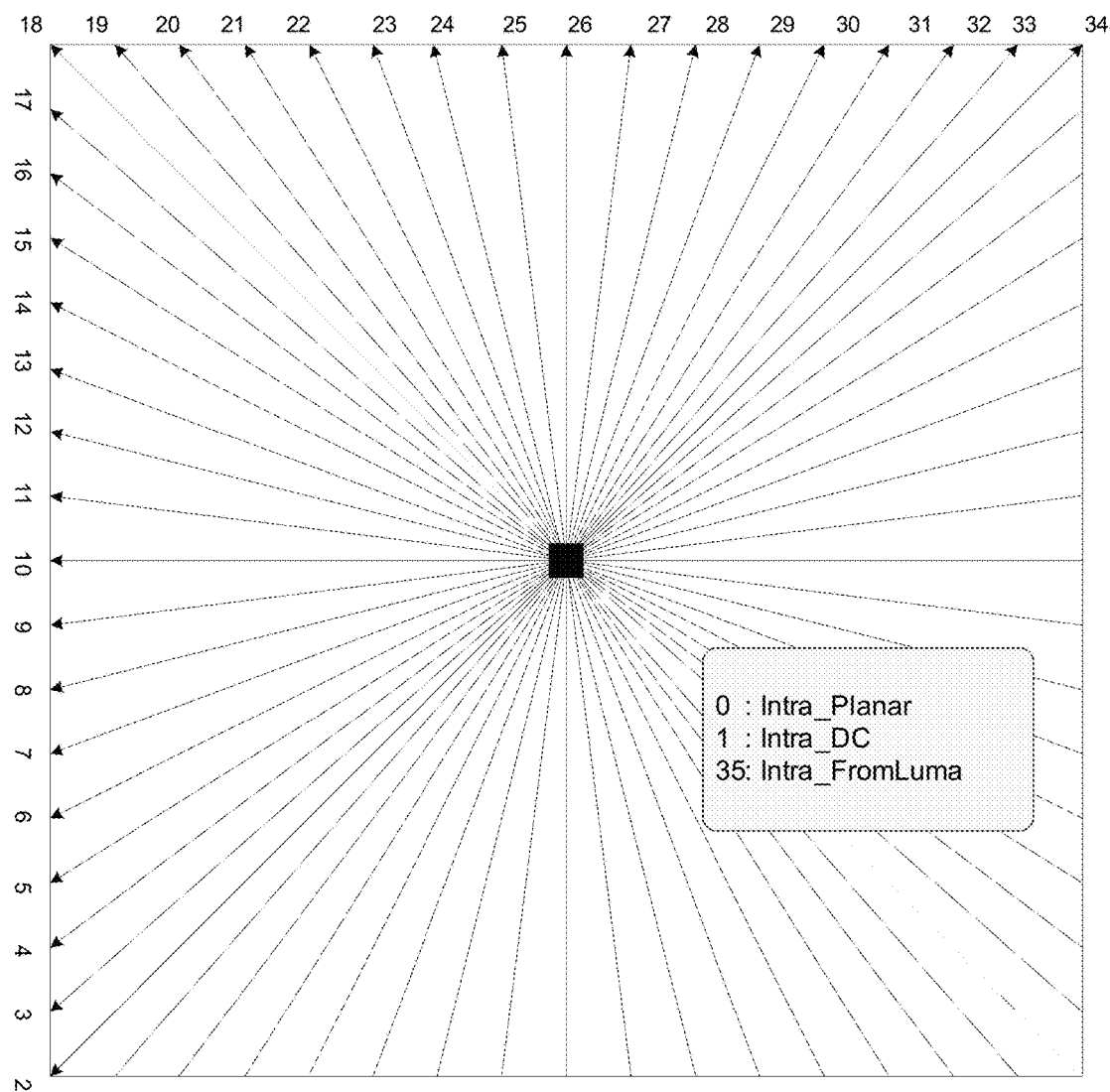
FIG. 6 is a diagram illustrating another example of 35 intra-prediction modes and their corresponding prediction directions.

FIG. 6 is a diagram illustrating another example of 35 intra-prediction modes and their corresponding prediction directions. As defined in the example of FIG. 6, each of 35 index values are uniquely assigned to different intra-prediction modes. In this example, index value 0 is mapped to the planar intra-prediction mode, index value 1 is mapped to DC intra-prediction mode, and index value 35 is mapped to the from_luma intra-prediction mode. The rest of the index values are assigned to the available set of different intra-prediction modes, each having a prediction direction.

The diagram of FIG. 6 shows IntraPredMode[xB][yB] labeled 0, 1, 2, . . . , 35 represents directions of predictions according to Table 3.1. Table 3.1 specifies the value for the intra prediction mode and the associated names. Mode 34, for example, is an intra-angular mode that points to an upper-right direction of the current block to be coded. In some examples, mode 34 is the upper-right direction intra-prediction mode.

TABLE 3.1

Specification of intra prediction mode and associated names

| Intra prediction mode | Associated names |
| --- | --- |
| 0 | Intra_Planar |
| 1 | Intra_DC |
| Otherwise (2 . . . 34) | Intra_Angular |
| 35 | Intra_FromLuma (used only for chroma) |

Inputs to an example derivation process for luma intra prediction modes includes a luma location (xB, yB) specifying the top-left luma sample of the current block relative to the top-left luma sample of the current picture, a variable log 2PUSize specifying the size of the current prediction unit, and variable arrays IntraPredMode (If available) that are previously (in decoding order) derived for adjacent coding units. Output of the example process derivation process for luma intra prediction modes is the variable IntraPredMode[xB][yB].

IntraPredMode[xB][yB] can be derived as the following ordered steps. First, the neighbouring locations (xBA, yBA) and (xBB, yBB) are set equal to (xB−1, yB) and (xB, yB−1), respectively. Second, the minimum coding block addresses cbAddrA and cbAddrB of the coding treeblocks covering the locations (xBA, yBA) and (xBB, yBB) respectively where are derived as follows:

cbAddrA
=MinCbAddrZS[xBA<<Log2MinCbSize]
[yBA<<Log2MinCbSize]
cbAddrB
=MinCbAddrZS[xBB<<Log2MinCbSize]
[yBB<<Log2MinCbSize]

Third, an availability process for a minimum coding block address specified is invoked once with the minimum coding block address cbAddrA as the input and the output assigned to availableA and once with the minimum coding block address cbAddrB as the input and the output assigned to availableB.

Fourth, for N being either replaced A or B, the variables intraPredModeN are derived as follows: If availableN is equal to FALSE, intraPredModeN is set equal to Intra_DC. Otherwise, if the coding unit covering (xBN, yBN) is not coded as intra mode, intraPredModeN is set equal to Intra_DC, otherwise, if yB−1 is less than yCtb, intraPredModeA is set equal to IntraPredMode[xBA][yBA] and intraPredModeB is set equal to Intra_DC. Otherwise, intraPredModeN is set equal to IntraPredMode[xBN][yBN], where IntraPredMode is the variable array assigned to the coding unit covering the luma location (xBN, yBN).

Fifth, the candModeList[x] with x=0 . . . 2 is derived as follows: If candIntraPredModeB is equal to candIntraPredModeA, the following applies: If candIntraPredModeA is less than 2 (either Intra_Planar or Intra_DC), candModeList[x] with x=0 . . . 2 is derived as:
candModeList[0]=Intra_Planar
candModeList[1]=Intra_DC
candModeList[2]=Intra_Angular (26)
Otherwise, candModeList[x] with x=0 . . . 2 is derived as:
candModeList[0]=candIntraPredModeA
candModeList[1]=2+((candIntraPredModeA−2−1) % 32
candModeList[2]=2+((candIntraPredModeA−2+1) % 32
Otherwise (candIntraPredModeB is not equal to candIntraPredModeA), the following applies: candModeList[0] and candModeList[1] are derived as follows:
candModeList[0]=candIntraPredModeA
candModeList[1]=candIntraPredModeB
If none of candModeList[0] and candModeList[1] is equal to Intra_Planar, candModeList[2] is set equal to Intra_Planar. Otherwise, if none of candModeList[0] and candModeList[1] is equal to Intra_DC, candModeList[2] is set equal to Intra_DC. Otherwise, candModeList[2] is set equal to Intra_Angular (26).

Sixth, IntraPredMode[xB][yB] is derived by applying the following procedure. If prev_intra_pred_flag[xB][yB] is equal to TRUE, the IntraPredMode[xB][yB] is set equal to candModeList[mpm_idx]. Otherwise IntraPredMode[xB][yB] is derived by applying the following ordered steps: First, array candModeList[x], x=0 . . . 2 is modified in the following way: If candModeList[0] is greater than candModeList[1], swap two values; if candModeList[0] is greater than candModeList[2], swap two values; and if candModeList[1] is greater than candModeList[2], swap two values. Second, IntraPredMode[xB][yB] is derived as the following ordered steps: First, IntraPredMode[xB][yB]=rem_intra_luma_pred_mode. When IntraPredMode[xB][yB] is greater than or equal to candModeList[0], the value of IntraPredMode[xB][yB] is increased by one. When IntraPredMode[xB][yB] is greater than or equal to candModeList[1], the value of IntraPredMode[xB][yB] is increased by one. When IntraPredMode[xB][yB] is greater than or equal to candModeList[2], the value of IntraPredMode[xB][yB] is increased by one.

An example derivation process for chroma intra prediction mode is defined as follows. An input to this process is a luma location (xB, yB) specifying the top-left luma sample of the current block relative to the top-left luma sample of the current picture. An output of this process is the variable IntraPredModeC. The chroma intra prediction mode IntraPredModeC is derived as specified in Tables 3.2 or 3.3 with intra_chroma_pred_mode, IntraPredMode[xB][yB] and chroma_pred_from_luma_enabled_flag as inputs.

TABLE 3.2

Specification of IntraPredModeC according to the values of intra_chroma_pred_mode and IntraPredMode[xB][yB] when chroma_pred_from_luma_enabled_flag is equal to 1

| | IntraPredMode[xB][yB] | | | | |
| --- | --- | --- | --- | --- | --- |
| intra_chroma_pred_mode | 0 | 26 | 10 | 1 | X (0 <= X < 35) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X |

TABLE 3.3

Specification of IntraPredModeC according to the values of intra_chroma_pred_mode and IntraPredMode[xB][yB] when chroma_pred_from_luma_enabled_flag is equal to 0

| | IntraPredMode[xB][yB] | | | | |
| --- | --- | --- | --- | --- | --- |
| intra_chroma_pred_mode | 0 | 26 | 10 | 1 | X (0 <= X < 35) |
| 0 | 34 | 0 | 0 | 0 | 0 |
| 1 | 26 | 34 | 26 | 26 | 26 |
| 2 | 10 | 10 | 34 | 10 | 10 |

TABLE 3.3-continued

Specification of IntraPredModeC according to the values of intra_chroma_pred_mode and IntraPredMode[xB][yB] when chroma_pred_from_luma_enabled_flag is equal to 0

| | IntraPredMode[xB][yB] | | | | |
|---|---|---|---|---|---|
| intra_chroma_pred_mode | 0 | 26 | 10 | 1 | X (0 <= X < 35) |
| 3 | 1 | 1 | 1 | 34 | 1 |
| 4 | 0 | 26 | 10 | 1 | X |

Further details regarding coding processes for coding units coded in intra-prediction mode can be found at High efficiency video coding (HEVC) text specification draft 6, JCT-VC of ITU-T SG16 WP3 and ISO/IEC JTC1/SC29/WG11, 7th Meeting, Geneva, 21-30 Nov., 2011, the entire contents of which are incorporated by reference. Further details regarding coding processes for coding units coded in intra-prediction mode in accordance with HEVC can be found in HEVC text specification draft 7, document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jun. 6, 2012, is downloadable from http://phenix.it-sudparis.eu/jct/doc_end_user/documents/9_Geneva/wg11/JCTVC-I1003-v3.zip.

Figure 7:
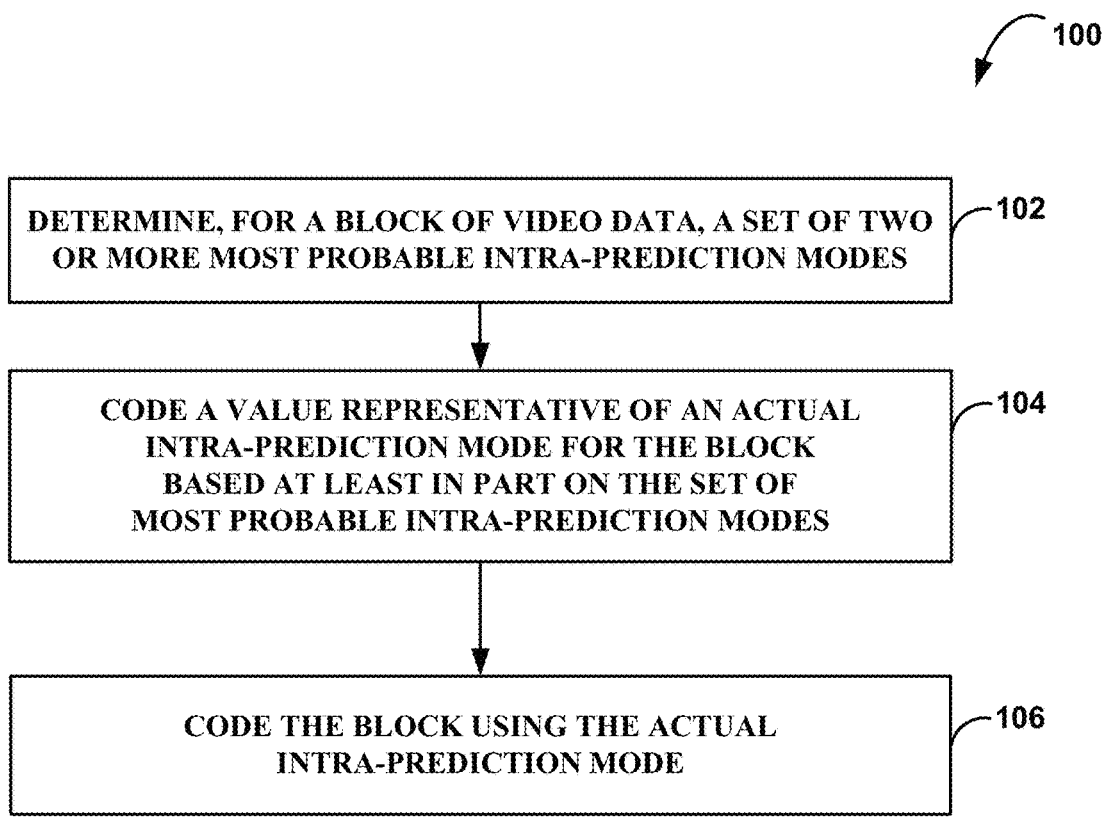
FIG. 7 is a flowchart illustrating one example of a method for intra-prediction mode signaling for video encoding.

FIG. 7 is a flowchart illustrating one example of a method 100 for intra-prediction mode signaling for video encoding. Method 100 may be performed by any one of system 10 of FIG. 1, video encoder 20 of FIG. 3, video decoder 30 of FIG. 4, or any other suitable device.

Method 100 includes determining, for a block of video data, a set of most probable intra-prediction modes such that the set of most probable intra-prediction modes has a size that is equal to a predetermined number that is greater than or equal to two (102). Method 100 may also include coding a value representative of an actual intra-prediction mode for the block based at least in part on the set of most probable intra-prediction modes (104). Further, method 100 includes coding the block using the actual intra-prediction mode (106).

Method 100 may include setting NumMPMC to a fixed number for a frame or picture, which is greater or equal to 2. For example, if NumMPMC=3, three candidate modes are selected under all circumstances for a given picture. Regarding a block in the picture, if both candIntraPredModeN are the same, the prediction direction for the candIntraPredModeN is determined. Of the available prediction modes for the block, the two prediction modes that have the closest prediction directions as the prediction direction of candIntraPredModeN are assigned to be the additional two candidate modes, bringing the total of most probable modes to the set fixed three modes. If the values for candIntraPredModeN are different, the additional candidate mode may be chosen to be DC, vertical, or horizontal modes.

In another example where NumMPMC=3, three candidate modes are selected under all circumstances for a given picture, wherein the set of three most probable intra-prediction modes includes DC mode, vertical mode, and planar mode.

Figure 8:
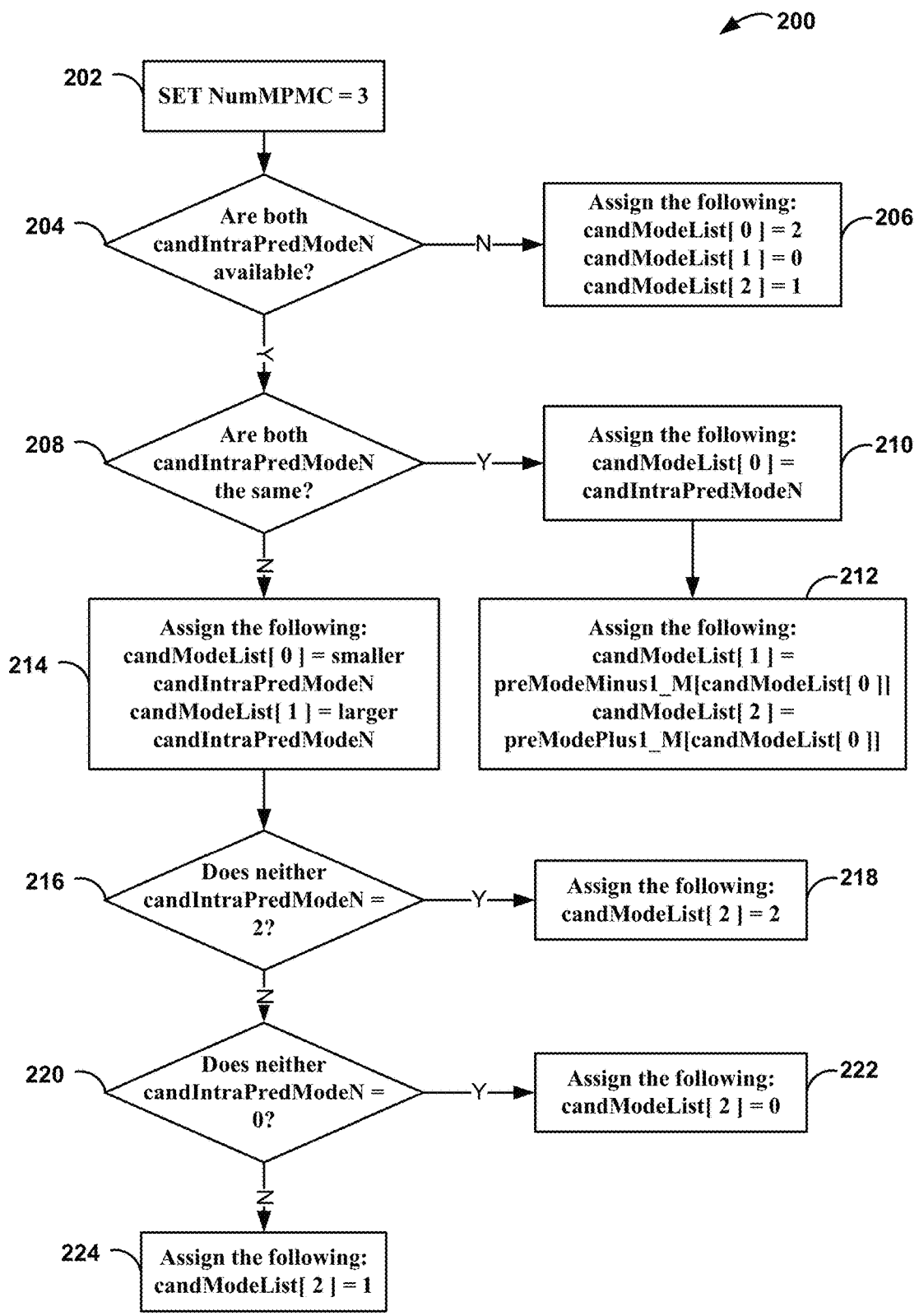
FIG. 8 is a flowchart illustrating one example of a method for determining most probable intra-prediction mode candidates when a set of most probable intra-prediction modes is equal to three.

FIG. 8 is a flowchart illustrating one example of a method 200 for determining most probable intra-prediction mode candidates when a set of most probable intra-prediction modes is equal to three. Method 200 may be performed by a video encoder, such as video encoder 20 of FIGS. 2 and 3. In other examples, method 200 may be performed by a video decoder, such as video decoder 30 of FIGS. 2 and 4.

The details of an example derivation of method 200 is as follows. First, NumMPMC is set equal to three most probable modes (202). In some examples, video encoder 20 or video decoder 30 set NumMPMC equal to three for a current block. In other examples, video encoder 20 or video decoder 30 determine NumMPMC from a previously coded block with respect to the current block, wherein the previously coded block is from the same frame as the current block.

Video encoder 20 or video decoder 30 determines whether both candIntraPredModeN are available in a set of available intra-prediction modes (204). The set of available intra-prediction modes may be based on intraPredModeNum, and may be, for example, equal to 17 or 34. If both candIntraPredModeN are not available, then the value 2 is assigned to candModeList[0], the value 0 is assigned to candModeList[1], and the value 1 is assigned to candModeList[2] (206). For example, if both candIntraPredModeN are not available candModeList[0] is assigned to DC mode, candModeList[1] is assigned to Planar mode, and candModeList[2] is assigned to vertical mode. For example, if both candIntraPredModeN are not available, then candModeList may be chosen to be DC, vertical, or horizontal. Otherwise, if both candIntraPredModeN are available, video encoder 20 or video decoder 30 determines whether both candIntraPredModeN have the same value, that is, point to the same intra-prediction mode (208).

If both candIntraPredModeN are the same, then this candIntraPredModeN is assigned to candModeList[0] (210). CandModeList[1] and candModeList[2] are then derived, by intra-prediction unit 46 or 74, respectively, by applying the following procedure: preModeMinus1_M[candModeList[0]] is assigned to candModeList[1] and PreModePlus1_M[candModeList[0]] is assigned to candModeList[2], where M represents intraPredModeNum (212). Tables 3.3, 4.3, and 5.3, provided below, can be used in determining these values. For example, using FIG. 5, if intraPredModeNum is equal to 34, and candModeList[0]=0 (meaning that candIntraPredModeN=0), then candModeList[1]=preModeMinus1_M[candModeList[0]]=21 and candModeList[2]=PreModePlus1_M[candModeList[0]]=22.

Turning back to FIG. 8, if both candIntraPredModeN are the same (208), then both candIntraPredModeN are assigned to the candidate modes list (214). For example, the smaller of the two candidates is assigned to candModeList[0] and the larger candidate is assigned to candModeList[1].

The remaining third candidate to be included in the set of most probable modes, CandModeList[2], is derived by applying the following procedure: Video encoder 20 or video decoder 30 determines whether either candIntraPredModeN is equal to the value 2 (216). If neither candIntraPredModeN is equal to the value 2, then the value 2 is assigned to candModeList[2] (218). This ensures that the value 2 is not repeated in the candidate mode list. If at least one of the candIntraPredModeN is equal to the value 2, then video encoder 20 or video decoder 30 determines whether either candIntraPredModeN is equal to the value 0 (220). If neither candIntraPredModeN is equal to the value 0, then the value 0 is assigned to candModeList[2] (222). Otherwise, the value 1 is assigned to candModeList[2] (224).

Table 4 provides an example candidate mode mapping with the variable intraPredModeNum is set to three. In one example, a video encoder, such as video encoder 20 of FIGS. 2 and 3, is configured with data corresponding to Table 4.3. Likewise, a video decoder, such as video decoder 30 of FIGS. 2 and 4, is configured with data corresponding to Table 4.3. Table 4.3 provides a mapping between a candidate (or actual) intra-prediction mode and the two closest intra-prediction modes to the intra-prediction mode when intraPredModeNum equals three. In some examples, the closest intra-prediction modes to the intra-prediction mode may be the closest in terms of prediction direction. The video coder may use the candidate mode mapping of Table 4.3 to determine which intra-prediction modes are included in a most probable modes candidate list for a current block when intraPredModeNum is equal to three.

TABLE 4.3

| Candidate mode mapping when intraPredModeNum is equal to 3 | | | |
|---|---|---|---|
| candModeList[0] | 0 | 1 | 2 |
| PreModeMinus1__3 | 2 | 2 | 0 |
| PreModePlus1__3 | 1 | 0 | 1 |

Table 5.3 provides an example candidate mode mapping with the variable intraPredModeNum is set to seventeen. In one example, a video encoder, such as video encoder 20 of FIGS. 2 and 3, is configured with data corresponding to Table 5.3. Likewise, a video decoder, such as video decoder 30 of FIGS. 2 and 4, is configured with data corresponding to Table 5.3. Table 5.3 provides a mapping between a candidate (or actual) intra-prediction mode and the two closest intra-prediction modes to the intra-prediction mode when intraPredModeNum equals seventeen. In some examples, the closest intra-prediction modes to the intra-prediction mode may be the closest in terms of prediction direction. The video coder may use the candidate mode mapping of Table 5.3 to determine which intra-prediction modes are included in a most probable modes candidate list for a current block when intraPredModeNum is equal to seventeen.

TABLE 5.3

| Candidate mode mapping when intraPredModeNum is equal to 17 | | | | | | | | | | | | |
|---|---|---|---|---|---|---|---|---|---|---|---|---|
| candModeList[0] | 0 | 1 | 2 | 3 | 4 | 5 | 6 | 7 | 8 | 9 | 10 | 11 |
| PreModeMinus1__17 | 11 | 16 | 0 | 14 | 10 | 12 | 13 | 15 | 9 | 6 | 3 | 4 |
| PreModePlus1__17 | 12 | 15 | 1 | 10 | 11 | 13 | 9 | 14 | 16 | 8 | 4 | 0 |
| candModeList[0] | 12 | | 13 | | 14 | | 15 | | 16 | | | |
| PreModeMinus1__17 | 0 | | 5 | | 7 | | 1 | | 8 | | | |
| PreModePlus1__17 | 5 | | 6 | | 3 | | 7 | | 1 | | | |

Table 6.3 provides an example candidate mode mapping with the variable intraPredModeNum is set to thirty-four. In one example, a video encoder, such as video encoder 20 of FIGS. 2 and 3, is configured with data corresponding to Table 6.3. Likewise, a video decoder, such as video decoder 30 of FIGS. 2 and 4, is configured with data corresponding to Table 6.3. Table 6.3 provides a mapping between a candidate (or actual) intra-prediction mode and the two closest intra-prediction modes to the intra-prediction mode when intraPredModeNum equals thirty-four. In some examples, the closest intra-prediction modes to the intra-prediction mode may be the closest in terms of prediction direction. The video coder may use the candidate mode mapping of Table 6.3 to determine which intra-prediction modes are included in a most probable modes candidate list for a current block when intraPredModeNum is equal to thirty-four.

TABLE 6.3

| Candidate mode mapping when intraPredModeNum is equal to 34 | | | | | | | | | | | |
|---|---|---|---|---|---|---|---|---|---|---|---|
| candModeList[0] | 0 | 1 | 2 | 3 | 4 | 5 | 6 | 7 | 8 | 9 | 10 |
| PreModeMinus1__34 | 21 | 30 | 0 | 26 | 19 | 23 | 25 | 28 | 32 | 33 | 18 |
| PreModePlus1__34 | 22 | 29 | 1 | 18 | 20 | 24 | 9 | 27 | 31 | 6 | 19 |
| candModeList[0] | 11 | 12 | 13 | 14 | 15 | 16 | 17 | 18 | 19 | 20 | 21 |
| PreModeMinus1__34 | 20 | 22 | 24 | 27 | 29 | 31 | 32 | 10 | 4 | 11 | 0 |
| PreModePlus1__34 | 21 | 23 | 25 | 26 | 28 | 30 | 33 | 3 | 10 | 4 | 11 |
| candModeList[0] | 22 | 23 | 24 | 25 | 26 | 27 | 28 | 29 | 30 | 31 | 32 | 33 |
| PreModeMinus1__34 | 12 | 5 | 13 | 6 | 3 | 14 | 7 | 15 | 1 | 16 | 8 | 17 |
| PreModePlus1__34 | 0 | 12 | 5 | 13 | 14 | 7 | 15 | 1 | 16 | 8 | 17 | 9 |

In some examples, where the NumMPMC is greater than or equal to two, one of the most probable candidate modes is the planar mode. For example, if NumMPMC is equal to four, three candidate modes may be determined as described above, while a fourth mode is set to planar mode. If one of the three candidate modes is already equal to planar mode, the fourth mode may be set equal to DC mode.

Another parameter, remaining intra-prediction mode, rem_intra_pred_mode, may also be defined. According to techniques of the present disclosure, rem_intra_pred_mode may have multiple contexts. The most probable mode can be used to predict the remaining intra-prediction mode. Each bin is coded with a context to better represent the statistic, resulting in improved most probable mode selection.

According to other techniques, codeword grouping may be provided. For example, all codewords for the intra-prediction modes may be divided into multiple groups. A fixed or variable length binarization may be used to signal the index of the group. Then, a fixed or variable length binarization may be used to signal the codeword index inside the group.

For example, three groups of codes are formed for intraPredModeNum is equal to 17 or 34. All groups but one have 2N bin strings, as shown in Table 7. In one example, a video encoder, such as video encoder 20 of FIGS. 2 and 3, is configured with data corresponding to Table 7. Likewise, a video decoder, such as video decoder 30 of FIGS. 2 and 4, is configured with data corresponding to Table 7.

TABLE 7

Number of bins for intraModeTable[rem_intra_luma_pred_mode]

| Value of intraModeTable[rem_intra_luma_pred_mode] | Number of Bins, N |
|---|---|
| <2 | 1 |
| ≥2 and <10 | 3 |
| ≥10 | 2 |
| <8 | 3 |
| ≥8 and <24 | 4 |
| ≥24 | 3 |

One exception to Table 7 is when the mapped rem_intra_luma_pred_mode is greater than 23 and the binarization is shown in Table 8. A unary binarization is used to indicate the group index of mapped rem_intra_luma_pred_mode. In one example, a video encoder, such as video encoder 20 of FIGS. 2 and 3, is configured with data corresponding to Table 8. Likewise, a video decoder, such as video decoder 30 of FIGS. 2 and 4, is configured with data corresponding to Table 8.

TABLE 8

Binarization table when intraModeTable[rem_intra_luma_pred_model] ≥24

| Value of intraModeTable[rem_intra_luma_pred_mode] | Bin string |
|---|---|
| 24 | 00 |
| 25 | 010 |
| 26 | 011 |
| 28 | 100 |
| 29 | 101 |
| 30 | 110 |
| 31 | 111 |

A codeword index is derived from an intra-prediction mode, regardless of whether the video coder is using VLC or CABAC. The codeword index may map to a binarized value, such as is shown in Table 8. A binarized value is a sequence of bits, which may be referred to as bins. Each bin may be coded sequentially. Thus, two tables are provided such that for each different scenario, the codewords are already provided in a table and do not have to be determined for each scenario. A single binarization table is provided regardless of which most probable intra-prediction modes are included in the candidate list.

Techniques described herein also provide fixed codeword and code table size for a chroma prediction mode under different luma prediction modes. Because of the inheritance mode, the existing approach removes any redundant codewords from the code tables. A fixed size code table can be beneficial for the parsing process because the decoding of the luma mode no longer needs to be done beforehand.

Two different approaches can be done to achieve a fixed size code table. First, one of the intra-prediction modes is disabled when there is not a redundant codeword, so a redundant codeword is created artificially. Second, a different mode is enabled to replace the redundant mode in order to eliminate the redundant codeword. Furthermore, a mapping of the codeword and the intra-prediction mode could be different for different luma prediction modes.

In another example, the mapping of the planar mode may be changed from the previous HEVC. For example, the planar mode may be mapped to index value 0. Subsequently, the index value associated with all the other intra-prediction modes may be shifted up by 1. This change will increase the probability of getting a smaller rem_intra_luma_pred_mode, since the planar mode is chosen more frequently.

Techniques of the disclosure fix the number of available chroma intra-prediction modes. The variable Intra_Pred_ModeC is a chroma intra-prediction mode. For example, six available chroma intra-prediction modes (IntraPredModeC) can be signaled. Two modes, luma signal prediction and reuse of the luma intra-prediction mode, remain unchanged. For the other four modes, two mode choices are added, which include the adjacent intra-prediction modes and the perpendicular adjacent intra-prediction modes. Table 9 provides an example index mapping for the adjacent intra-prediction modes. Table 9 provides an example index mapping for the perpendicular adjacent intra-prediction modes.

TABLE 9

Perpendicular mode mapping when intraPredModeNum is equal to 18

| intraPredMode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| PredMode_P_17 | 1 | 0 | 0 | 6 | 8 | 7 | 3 | 5 | 4 | 3 | 8 | 16 | 15 | 14 | 13 | 12 | 11 |

TABLE 9

| Perpendicular mode mapping when intraPredModeNum is equal to 35 | | | | | | | | | | | | | | | | | | |
|---|---|---|---|---|---|---|---|---|---|---|---|---|---|---|---|---|---|---|
| intraPredMode | 0 | 1 | 2 | 3 | 4 | 5 | 6 | 7 | 8 | 9 | 10 | 11 | 12 | 13 | 14 | 15 | 16 | 17 |
| PredMode_P_34 | 1 | 0 | 0 | 6 | 8 | 7 | 3 | 5 | 4 | 3 | 8 | 16 | 15 | 14 | 13 | 12 | 11 | 10 |
| intraPredMode | 18 | 19 | 20 | 21 | 22 | 23 | 24 | 25 | 26 | 27 | 28 | 29 | 30 | 31 | 32 | 33 | 34 | |
| PredMode_P_34 | 33 | 32 | 31 | 30 | 29 | 28 | 27 | 26 | 25 | 24 | 23 | 22 | 21 | 20 | 19 | 18 | 0 | |

The other four modes are derived as follow: If intrapred mode is equal to 2, 0 is assigned to intra_chroma_pred_mode[0], 1 is assigned to intra_chroma_pred_mode[1], 6 is assigned to intra_chroma_pred_mode[2], and 35 is assigned to intra_chroma_pred_mode[3]. If intra_pred_mode is equal to 35, for example, 0 is assigned to intra_chroma_pred_mode[0], 1 is assigned to intra_chroma_pred_mode[1], 2 is assigned to intra_chroma_pred_mode[2], and 6 is assigned to intra_chroma_pred_mode[3].

If, for example, intraPredModeNum is equal to 18 or 35, intra_chroma_pred_mode[0], intra_chroma_pred_mode[1], and intra_chroma_pred_mode[2] are derived by applying the following procedure, using some of the tables, such as Tables 8 and 9. PredModeMinus1_M[intra_pred_mode] is assigned to intra_chroma_pred_mode[0], PredModePlus1_M[intra_pred_mode] is assigned to intra_chroma_pred_mode[1], PredMode_P_M[intra_pred_mode] is assigned to intra_chroma_pred_mode[2], and 35 is assigned to intra_chroma_pred_mode[3], where M represents intraPredModeNum. Otherwise, 0 is assigned to intra_chroma_pred_mode[0], 1 is assigned to intra_chroma_pred_mode[1], 2 is assigned to intra_chroma_pred_mode[2], and 35 is assigned to intra_chroma_pred_mode[3].

In another example where the number of available chroma intra-prediction modes is fixed, any redundant intra_pred_mode in the list of candidate intra-prediction modes may be replaced with a predefined intra-prediction mode.

In another example, NumMPMC may be set to four. That is, four candidate modes are selected under all circumstances for a given video frame (i.e., NumMPMC=4). If both candIntraPredModeN are the same, the two available prediction modes that are closest to candIntraPredModeN in the prediction direction are assigned to be two additional candidate modes. If candIntraPredModeN are different, the additional candidate mode may be chosen to be the DC, the vertical, or the horizontal mode.

An example derivation for the candidate mode lists are as follows for when NumMPMC=4: If both candIntraPredModeN are not available, then the value 3 is assigned to candModeList[0], the value 0 is assigned to candModeList[1], the value 1 is assigned to candModeList[2], and the value 2 is assigned to candModeList[3]. Otherwise, if both candIntraPredModeN are the same, then this candIntraPredModeN is assigned to candModeList[0]. CandModeList[1] and candModeList[2] are derived by applying the following procedure, using Tables 3.4, 4.4, and 5.4.

As can be seen in Tables 3.4, 4.4, and 5.4, If candModeList[0] is not equal to, the value 0 is assigned to candModeList[1]. Otherwise, the value 2 is assigned to candModeList[1]. PreModeMinus1_M[candModeList[0]] is assigned to candModeList[2] and PreModePlus1_M[candModeList[0]] is assigned to candModeList[3], where M represents intraPredModeNum.

Otherwise, both candIntraPredModeN are assigned to the candidate modes list with the smaller of the two candidates at candModeList[0] and the larger at candModeList[1]. The variables candModeList[2], candModeList[3], and candModeList[4] are derived by applying the following procedure: If candIntraPredMode[0]=0, then candModeList[2]=PreModeMinus1_M[candModeList[1]] and candModeList[3]=PreModePlus1_M[candModeList[1]]. Otherwise, if candIntraPredMode1=0, then candModeList[2]=PreModeMinus1_M[candModeList[0]] and candModeList[3]=PreModePlus1_M[candModeList[0]]. Otherwise, candModeList[2]=0, and the variables candModeList[3] and candModeList[4] are picked first two available members from the following set:

$$\left\{\begin{array}{l} PreModeMinus1\_M[candIntraPredMode0], \\ PreModeMinus1\_M[candIntraPredMode1], \\ PreModePlus1\_M[candIntraPredMode0], \\ PreModePlus1\_M[candIntraPredMode1], \\ 3 \end{array}\right\}$$

A mode may be defined as available when the mode has not previously existed in the candModeList.

Tables 3.4, 4.4, and 5.4 are provided below, and are analogous to Tables 3.3, 4.3, and 5.3, provided above. Tables 3.3, 4.3, and 5.3 apply to examples where intraPredModeNum is equal to 3. In contrast, Tables 3.4, 4.4, and 5.4 apply to examples where intraPredModeNum is equal to 4. Specifically, Table 4.4 provides an example candidate mode mapping when intraPredModeNum is equal to 4.

TABLE 4.4

| Candidate mode mapping when intraPredModeNum is equal to 4 | | | |
|---|---|---|---|
| candModeList[0] | 1 | 2 | 3 |
| PreModeMinus1_4 | 3 | 3 | 1 |
| PreModePlus1_4 | 2 | 1 | 2 |

Table 5.4 provides an example candidate mode mapping when intraPredModeNum is equal to 18.

TABLE 5.4

| Candidate mode mapping when intraPredModeNum is equal to 18 | | | | | | | | | | | | | | | | | | |
|---|---|---|---|---|---|---|---|---|---|---|---|---|---|---|---|---|---|---|
| candModeList[0] | 0 | 1 | 9 | 3 | 4 | 5 | 6 | 7 | 8 | 9 | 10 | 11 | 12 | 13 | 14 | 15 | 16 | 17 |
| PreModeMinus1__18 | 1 | 12 | 17 | 1 | 15 | 11 | 13 | 14 | 16 | 10 | 7 | 4 | 5 | 1 | 6 | 8 | 2 | 9 |
| PreModePlus1__18 | 2 | 13 | 16 | 2 | 11 | 12 | 14 | 10 | 15 | 17 | 9 | 5 | 1 | 6 | 7 | 4 | 8 | 2 |
| Last_MPM__18 | 9 | 2 | 1 | 9 | 3 | 1 | 1 | 3 | 2 | 2 | 3 | 15 | 13 | 12 | 3 | 11 | 17 | 16 |

Table 6.4 provides an example candidate mode mapping when intraPredModeNum is equal to 35.

TABLE 6.4

| Candidate mode mapping when intraPredModeNum is equal to 35 | | | | | | | | | | | | | | | | | |
|---|---|---|---|---|---|---|---|---|---|---|---|---|---|---|---|---|---|
| candModeList[0] | 0 | 1 | 2 | 3 | 4 | 5 | 6 | 7 | 8 | 9 | 10 | 11 | 12 | 13 | 14 | 15 | 16 |
| PreModeMinus1__35 | 1 | 22 | 31 | 1 | 27 | 20 | 24 | 26 | 29 | 33 | 34 | 19 | 21 | 23 | 25 | 28 | 30 |
| PreModePlus1__35 | 2 | 23 | 30 | 2 | 19 | 21 | 25 | 10 | 28 | 32 | 7 | 20 | 22 | 24 | 26 | 27 | 29 |
| Last_MPM__35 | 9 | 2 | 1 | 9 | 3 | 1 | 1 | 3 | 9 | 2 | 3 | 15 | 13 | 12 | 3 | 11 | 17 |
| candModeList[0] | 17 | 18 | 19 | 20 | 21 | 22 | 23 | 24 | 25 | 26 | 27 | 28 | 29 | 30 | 31 | 32 | 33 | 34 |
| PreModeMinus1__35 | 32 | 34 | 4 | 11 | 5 | 12 | 1 | 13 | 6 | 14 | 15 | 8 | 16 | 2 | 17 | 9 | 18 | 10 |
| PreModePlus1__35 | 31 | 33 | 11 | 5 | 12 | 1 | 13 | 6 | 14 | 7 | 4 | 15 | 8 | 16 | 2 | 17 | 9 | 18 |
| Last_MPM___35 | 16 | 3 | 27 | 19 | 22 | 23 | 22 | 23 | 3 | 3 | 19 | 27 | 30 | 31 | 30 | 31 | 3 | 3 |

According to another example, NumMPMC may be equal to 5. That is, five candidate modes are selected under all circumstances (i.e., NumMPMC=5), except intraPredModeNum=4, where NumMPMC=4. If NumMPMC=4, the derivation of candModeList[4] is skipped. In this example of NumMPMC=5, planar mode is assumed to be set to the value 0. If both candIntraPredModeN are the same, that is, for example, if the intra prediction modes of the left-neighboring and above-neighboring blocks are the same, the two available prediction modes that are closest to candIntraPredModeN in the prediction direction may be assigned to be the additional two candidate modes. If candIntraPredModeN are different, the additional candidate mode may be chosen to be the DC, the vertical, or the horizontal mode.

The details of an example derivation are as follows: If both candIntraPredModeN are not available, then the value 3 is assigned to candModeList[0], the value 0 is assigned to candModeList[1], the value 1 is assigned to candModeList[2], the value 2 is assigned to candModeList[3], and the value 9 is assigned to candModeList[4]. For example, candIntraPredMode0 may correspond to the left neighboring block (block 6 in FIG. 1) and candIntraPredMode1 may correspond to the above-neighboring block (block 4 in FIG. 1). Otherwise, if both candIntraPredModeN are available and are the same, then the value of the same candIntraPredModeN is assigned to candModeList[0].

The values for candModeList[1] and candModeList[2] are derived by applying the following procedure, using Tables 2.4, 3.4, and 4.4. If candModeList[0] is not equal to 0 or 2, the value 0 is assigned to candModeList[1]. Otherwise, the value 2 is assigned to candModeList[1]. PreModeMinus1_M[candModeList[0]] is assigned to candModeList[2], PreModePlus1_M[candModeList[0]] is assigned to candModeList[3], and Last_MPM[candModeList[0]] is assigned to candModeList[4], where M represents intraPredModeNum.

Otherwise, both candIntraPredModeN are assigned to the candidate modes list with the smaller of the two candidates at candModeList[0] and the larger at candModeList[1]. The variables candModeList[2], candModeList[3] and candModeList[4] are derived by applying the following procedure. If candIntraPredMode0=0, then candModeList[2]=PreModeMinus1_M[candModeList[1]], candModeList[3]=PreModePlus1_M[candModeList[1]], and candModeList[4]=LastMPM_M[candModeList[1]]. Otherwise, if candIntraPredMode1=0, then candModeList[2]=PreModeMinus1_M[candModeList[0]], candModeList[3]=PreModePlus1_M[candModeList[0]], and candModeList[4]=LastMPM_M[candModeList[0]]. Otherwise, candModeList[2]=0, and candModeList[3] and candModeList[4] are picked from the first two available members from the following set:

$$\left\{ \begin{array}{l} PreModeMinus1\_M[candIntraPredMode0], \\ PreModeMinus1\_M[candIntraPredMode1], \\ PreModePlus1\_M[candIntraPredMode0], \\ PreModePlus1\_M[candIntraPredMode1], \\ 3 \\ Last\_MPM\_M[candIntraPredMode0], \text{ and} \\ Last\_MPM\_M[candIntraPredMode1] \end{array} \right\}$$

A mode may be defined as available when the mode has not previously existed in the candModeList.

Regarding chroma intra-prediction mode signaling, the current HEVC allows 6 modes, planar, vertical, horizontal, DC, Luma signal based chroma prediction, and inheritance of Luma prediction mode. An index assignment for these modes may be as follows: planar(0), vertical(1), horizontal (2), DC(3), and Luma signal based chroma prediction(35). However, in other examples, other index assignments are used. Among all, the inheritance of Luma prediction mode means the chroma prediction direction is the same as luma prediction direction.

For example, 0 is assigned to intra_chroma_pred_mode[0], 1 is assigned to intra_chroma_pred_mode[1], 2 is assigned to intra_chroma_pred_mode[2], and 3 is assigned to intra_chroma_pred_mode[3]. If intra_pred_mode is equal to 0, 1, 2, or 3 (that is, planar, vertical, horizontal, or DC mode), 7 is assigned to intra_chroma_pred_mode[intra_pred_mode]. FIG. 6 illustrates another example having a different mapping of index values to intra-prediction modes for luma components. For example, in FIG. 6, if intra_pred_mode is equal to 0, 10, 26, or 1 (planar, vertical, horizontal, or DC mode, respectively), then 34 (upper-right) is assigned to intra_chroma_pred_mode[intra_pred_mode]. That is, if intra_pred_mode is equal to planar, vertical, horizontal, or DC mode, then intra_chroma_pred_mode[intra_pred_mode] is equal to the upper-right directional mode.

Last_MPM design may be the same for intraPredModeNum=18 and the first 18 modes when intraPredModeNum=35 to have the same table size. Also, when intraPredModeNum=35, the last 17 modes can be symmetrically designed with respect to mode 1, 2, and 4 to further save the table size.

In another example, the number of available chroma intra-prediction modes may be fixed. For example, six available chroma intra-prediction modes (IntraPredModeC) can be signaled. Two modes, luma signal prediction and reuse of the luma intra-prediction mode, remain unchanged. For the other four modes, two choices are added, which are the adjacent intra-prediction modes (Table 4.4 and Table 5.4) and the perpendicular adjacent intra-prediction modes (Table 8 and Table 9).

The other four modes are derived as follow. 0 is assigned to intra_chroma_pred_mode[0], 1 is assigned to intra_chroma_pred_mode[1], 2 is assigned to intra_chroma_pred_mode[2] and 3 is assigned to intra_chroma_pred_mode[3]. If intra_pred_mode is equal to 0 or 3, 7 is assigned to intra_chroma_pred_mode[intra_pred_mode]. Otherwise, PredModeMinus1_M[intra_pred_mode] is assigned to intra_chroma_pred_mode[0], PredModePlus1_M[intra_pred_mode] is assigned to intra_chroma_pred_mode[1], PredMode_P_M[intra_pred_mode] is assigned to intra_chroma_pred_mode[2].

one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

TABLE 8

Perpendicular mode mapping when intraPredModeNum is equal to 18

| intraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| PredMode_P_18 | 1 | 2 | 1 | 1 | 7 | 9 | 8 | 4 | 6 | 5 | 4 | 9 | 17 | 16 | 15 | 14 | 13 | 12 |

TABLE 9

Perpendicular mode mapping when intraPredModeNum is equal to 35

| intraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| PredMode_P_35 | 1 | 2 | 1 | 1 | 7 | 9 | 8 | 4 | 6 | 5 | 4 | 9 | 17 | 16 | 15 | 14 | 13 | 12 |
| intraPredMode | 18 | 19 | 20 | 21 | 22 | 23 | 24 | 25 | 26 | 27 | 28 | 29 | 30 | 31 | 32 | 33 | 34 | |
| PredMode_P_35 | 11 | 34 | 33 | 32 | 31 | 30 | 29 | 28 | 27 | 26 | 25 | 24 | 23 | 22 | 21 | 20 | 19 | |

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
   determining, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode,
   wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and
   wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;
   encoding, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and
   encoding the chrominance block using the actual intra-prediction mode for the chrominance block.

2. The method of claim 1, wherein when the actual intra-prediction mode is the planar, vertical, horizontal, or DC mode, a chroma intra-prediction mode is an upper-right direction intra-prediction mode.

3. The method of claim 1, wherein a chroma prediction direction is the same as a luma prediction direction.

4. A method of decoding video data, the method comprising:
   determining, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode,
   wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and
   wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;
   decoding, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and
   decoding the chrominance block using the actual intra-prediction mode for the chrominance block.

5. The method of claim 4, wherein when the actual intra-prediction mode is the planar, vertical, horizontal, or DC mode, a chroma intra-prediction mode is an upper-right direction intra-prediction mode.

6. The method of claim 4, wherein a chroma prediction direction is the same as a luma prediction direction.

7. A non-transitory computer program product comprising a computer-readable storage medium having stored thereon instructions that, when executed, cause a processor of a video encoding device to:
   determine, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode,
   wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and
   wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;
   encode, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and encode the chrominance block using the actual intra-prediction mode for the chrominance block.

8. The non-transitory computer program product of claim 7, wherein when the actual intra-prediction mode is the planar, vertical, horizontal, or DC mode, a chroma intra-prediction mode is an upper-right direction intra-prediction mode.

9. The non-transitory computer program product of claim 7, wherein a chroma prediction direction is the same as a luma prediction direction.

10. A non-transitory computer program product comprising a computer-readable storage medium having stored thereon instructions that, when executed, cause a processor of a video encoding device to:

determine, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode, wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;

decode, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and decode the chrominance block using the actual intra-prediction mode for the chrominance block.

11. The non-transitory computer program product of claim 10, wherein when the actual intra-prediction mode is the planar, vertical, horizontal, or DC mode, a chroma intra-prediction mode is an upper-right direction intra-prediction mode.

12. The non-transitory computer program product of claim 10, wherein a chroma prediction direction is the same as a luma prediction direction.

13. A device for video encoding, comprising:

means for determining, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode, wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode; and means for encoding, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and means for encoding the chrominance block using the actual intra-prediction mode for the chrominance block.

14. The device of claim 13, wherein when the actual intra-prediction mode is the planar, vertical, horizontal, or DC mode, a chroma intra-prediction mode is an upper-right direction intra-prediction mode.

15. The device of claim 13, wherein a chroma prediction direction is the same as a luma prediction direction.

16. A device for video decoding, comprising:

means for determining, for a chrominance block corresponding to a luminance block, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode, wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode; and means for encoding, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and means for encoding the chrominance block using the actual intra-prediction mode for the chrominance block.

17. The device of claim 16, wherein when the actual intra-prediction mode is the planar, vertical, horizontal, or DC mode, a chroma intra-prediction mode is an upper-right direction intra-prediction mode.

18. The device of claim 16, wherein a chroma prediction direction is the same as a luma prediction direction.

19. A device for encoding video data, the device comprising:

a memory configured to store a block of video data; and
a video encoder configured to:
determine, for a chrominance block corresponding to a luminance block of the block of video data, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode,
wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and
wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;
encode, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and
encode the chrominance block using the actual intra-prediction mode for the chrominance block.

20. The device of claim 19, wherein when the actual intra-prediction mode is the planar, vertical, horizontal, or DC mode, a chroma intra-prediction mode is an upper-right direction intra-prediction mode.

21. The device of claim 19, wherein a chroma prediction direction is the same as a luma prediction direction.

22. A device for decoding video data, the device comprising:

a memory configured to store a block of video data; and
a video decoder configured to:
determine, for a chrominance block corresponding to a luminance block of the block of video data, a mapping of a set of values to a set of intra-prediction modes that are available for the chrominance block, the set of intra-prediction modes that are available for the chrominance block comprising horizontal mode, vertical mode, planar mode, DC mode, and luma signal prediction mode,
wherein when an actual intra-prediction mode for the luminance block comprises a mode other than horizontal mode, vertical mode, planar mode, and DC mode, the set of intra-prediction modes that are available for the chrominance block further comprises a reuse of luma intra-prediction mode mapped from a first value of the set of values, and
wherein when the actual intra-prediction mode for the luminance block comprises one of horizontal mode, vertical mode, planar mode, and DC mode, the set of intra-prediction modes that are available for the chrominance block further comprises a mode other than horizontal mode, vertical mode, planar mode, and DC mode mapped from the first value of the set of values, and the set of intra-prediction modes that are available for the chrominance block does not comprise the reuse of luma intra-prediction mode;
decode, based on the mapping of the set of values to the set of intra-prediction modes that are available for the chrominance block, a value representative of an actual intra-prediction mode for the chrominance block, wherein the actual intra-prediction mode for the chrominance block is an intra-prediction mode in the set of intra-prediction modes that are available for the chrominance block; and
decode the chrominance block using the actual intra-prediction mode for the chrominance block.

23. The device of claim 22, wherein when the actual intra-prediction mode is the planar, vertical, horizontal, or DC mode, a chroma intra-prediction mode is an upper-right direction intra-prediction mode.

24. The device of claim 22, wherein a chroma prediction direction is the same as a luma prediction direction.

* * * * *